US00RE46687E

(19) United States
(12) Reissued Patent
Schmidt et al.

(10) Patent Number: US RE46,687 E
(45) Date of Reissued Patent: Jan. 30, 2018

(54) PHOTO-CHROMIC AND PHOSPHORESCENT TOYS

(71) Applicant: Shoot The Moon Products II, LLC, Pleasanton, CA (US)

(72) Inventors: Christopher B. Schmidt, Oakland, CA (US); William J. Hudson, Pleasanton, CA (US); Sunil W. Moothedah, Pleasanton, CA (US); David B. Small, San Jose, CA (US); Paul S. Rago, Danville, CA (US); Brian D. Farley, Dublin, CA (US)

(73) Assignee: Shoot The Moon Products II, LLC, Pleasanton, CA (US)

(21) Appl. No.: 15/002,166

(22) Filed: Jan. 20, 2016

Related U.S. Patent Documents

Reissue of:
(64) Patent No.: 8,684,784
Issued: Apr. 1, 2014
Appl. No.: 11/603,847
Filed: Nov. 22, 2006

U.S. Applications:
(60) Provisional application No. 60/739,551, filed on Nov. 23, 2005.

(51) Int. Cl.
*A63H 33/22* (2006.01)
*B44F 1/10* (2006.01)

(52) U.S. Cl.
CPC ..... *A63H 33/22* (2013.01); *B44F 1/10* (2013.01)

(58) Field of Classification Search
CPC ..... A63H 33/22; B44F 1/10
USPC ..... 446/146, 175, 219; 362/34, 118, 234; 472/72; 273/251
See application file for complete search history.

(56) References Cited

U.S. PATENT DOCUMENTS

| | | | | |
|---|---|---|---|---|
| 1,807,415 | A * | 5/1931 | La France | 401/6 |
| 2,297,033 | A * | 9/1942 | Stahr | 428/29 |
| 2,730,993 | A * | 1/1956 | Boyle | 401/217 |
| 2,882,246 | A * | 4/1959 | Leatherman et al. | 524/277 |
| 2,921,407 | A * | 1/1960 | Wagner et al. | 446/385 |
| 3,074,975 | A * | 1/1963 | McCormick et al. | 552/201 |
| 3,134,674 | A * | 5/1964 | Brown, Jr. | 430/508 |

(Continued)

FOREIGN PATENT DOCUMENTS

JP 07-314984 12/1995

OTHER PUBLICATIONS

Chromatic Technologies, Incorporated , "Corporate Website Page", (2005), 1 page.

(Continued)

*Primary Examiner* — Joseph Kaufman
(74) *Attorney, Agent, or Firm* — Blakely Sokoloff Taylor & Zafman LLP

(57) ABSTRACT

In one embodiment of the invention, photo-chromic and phosphorescent toys are disclosed. A photo-chromic and phosphorescent toy includes both photo-chromic and phosphorescent materials applied to the toy such as through an ink, paint, plastic, or dye. The photo-chromic and phosphorescent materials may be supplied within a material of the toy or applied-to a surface of the toy at the factory. The photo-chromic and phosphorescent materials may be activated in various ways with various light activating devices that can generate an activating light with appropriate wavelengths.

28 Claims, 23 Drawing Sheets

(56) References Cited

U.S. PATENT DOCUMENTS 3,166,050 A * 1/1965 Harvey et al. ..... 401/215
3,443,332 A * 5/1969 Christy ..... 40/544
3,652,285 A * 3/1972 Delzenne et al. ..... 430/190
3,696,098 A * 10/1972 Hoefnagels et al. ..... 548/409
3,813,554 A * 5/1974 Chang et al. ..... 250/461.1
3,933,708 A * 1/1976 Brinkman ..... 523/164
3,980,300 A * 9/1976 Hornsby, Jr. ..... 473/594
4,026,869 A * 5/1977 Evens et al. ..... 528/185
4,036,805 A * 7/1977 Tsujimoto et al. ..... 524/242
4,134,853 A * 1/1979 Ehrlich et al. ..... 252/600
4,212,786 A * 7/1980 Murakami ..... 523/164
4,257,188 A * 3/1981 Barker ..... 446/295
4,427,387 A * 1/1984 Tomita ..... 434/88
4,525,214 A * 6/1985 Panken ..... 106/31.08
4,590,381 A * 5/1986 Mendelson ..... 250/483.1
4,599,614 A * 7/1986 DeBerry et al. ..... 345/105
4,779,166 A * 10/1988 Tanaka et al. ..... 362/629
4,826,550 A * 5/1989 Shimizu et al. ..... 156/166
4,844,990 A * 7/1989 White ..... 428/690
4,917,643 A 4/1990 Hippely et al.
4,917,653 A * 4/1990 Collucci ..... 464/85
5,001,243 A * 3/1991 Fischer et al. ..... 552/201
5,091,006 A * 2/1992 Sarada et al. ..... 106/31.32
5,177,227 A * 1/1993 Fischer et al. ..... 552/201
5,190,298 A * 3/1993 Lee et al. ..... 273/430
5,203,702 A * 4/1993 Wilson ..... B43L 1/006 281/51
5,208,132 A * 5/1993 Kamada et al. ..... 430/138
5,208,354 A * 5/1993 Fischer et al. ..... 552/200
5,294,522 A * 3/1994 Uchida et al. ..... 430/345
5,407,885 A * 4/1995 Fischer et al. ..... 502/172
5,441,418 A * 8/1995 Brown et al. ..... 434/85
5,474,603 A * 12/1995 Miyashita et al. ..... 106/31.33
5,480,338 A * 1/1996 Barthold ..... 446/219
5,498,280 A * 3/1996 Fistner et al. ..... C09D 13/00 106/31.64
5,503,583 A * 4/1996 Hippely et al. ..... 446/14
5,698,301 A * 12/1997 Yonetani ..... B32B 7/02 250/484.4
5,914,197 A * 6/1999 Goudjil ..... 428/537.5
5,936,878 A * 8/1999 Arsenov et al. ..... 365/111
5,945,252 A * 8/1999 Sokoluk et al. ..... 430/270.15
5,983,065 A * 11/1999 Folkins et al. ..... 399/366
6,036,334 A * 3/2000 Nakano ..... 362/234
6,074,465 A * 6/2000 Fukuo et al. ..... 106/31.07
6,099,629 A * 8/2000 Morita et al. ..... 106/31.6
6,145,512 A * 11/2000 Daley ..... 132/76.4
6,322,416 B1 * 11/2001 Burke ..... 446/175
6,416,853 B1 * 7/2002 Nakashima ..... A63H 33/22 428/29
6,499,840 B2 * 12/2002 Day et al. ..... 347/100
6,585,555 B2 * 7/2003 Wong et al. ..... 446/153
6,595,826 B2 * 7/2003 Koizumi ..... 446/219
6,666,742 B2 * 12/2003 Koizumi ..... 446/219
6,860,616 B2 * 3/2005 Yu et al. ..... 362/118
6,902,334 B1 * 6/2005 Kung ..... 401/109
6,916,537 B2 * 7/2005 Welch et al. ..... C03C 17/32 351/159.61
2002/0115375 A1 * 8/2002 Koizumi ..... A63H 33/22 446/146
2003/0127797 A1 * 7/2003 Katz et al. ..... 273/251
2003/0137258 A1 * 7/2003 Piepgras et al. ..... 315/291
2004/0076460 A1 * 4/2004 Yu et al. ..... B43L 1/02 401/1
2004/0135097 A1 * 7/2004 Shibahashi et al. ... A63H 33/22 250/474.1
2004/0266554 A1 * 12/2004 Park et al. ..... A63B 37/0003 473/353
2006/0226235 A1 * 10/2006 Shepherd et al. ..... 235/487

OTHER PUBLICATIONS

Chromatic Technologies, Incorporated , "DynaColor Data Sheet for Glow-in-the-Dark UV Offset Ink", http://www.ctiinks.com, (Revised Sep. 2004), 2 pages.

Chromatic Technologies, Incorporated , "DynaColor Data Sheet for Photochromic Flexographic Ink", http://www.ctiinks.com, (Revised Sep. 2004), 1 page.

Chromatic Technologies, Incorporated , "DynaColor Data Sheet for Photochromic Textile Screen Ink", http://www.ctiinks.com, (Revised Sep. 2004), 1 page.

Chromatic Technologies, Incorporated , "DynaColor Data Sheet for Photochromic UV Flexographic Ink", http://www.ctiinks.com, (Revised Sep. 2004), 2 pages.

Chromatic Technologies, Incorporated , "DynaColor Data Sheet for Photochromic UV Offset Ink", http://www.ctiinks.com, (Revised Sep. 2004), 2 pages.

Chromatic Technologies, Incorporated , "Dynacolor Data Sheet for Photochromic Water-Based Flexographic Ink", http://www.ctiinks.com, (Revised Sep. 2004), 3 pages.

Sanghavi, Jayesh M., "trade lead for Photo Chromic Text Screen Ink", www.tradeindia.com, (Jun. 19, 2004), 1 page.

Sanghavi, Jayesh Manilal, trade lead for Photo Chromic Text Screen Ink, Jun. 19, 2004, 1 page, www.tradeindia.com.

"International Search Report and Written Opinion of the International Searching Authority, dated Aug. 7, 2008", International Application No. PCT/US06/33644.

* cited by examiner

FIG. 1
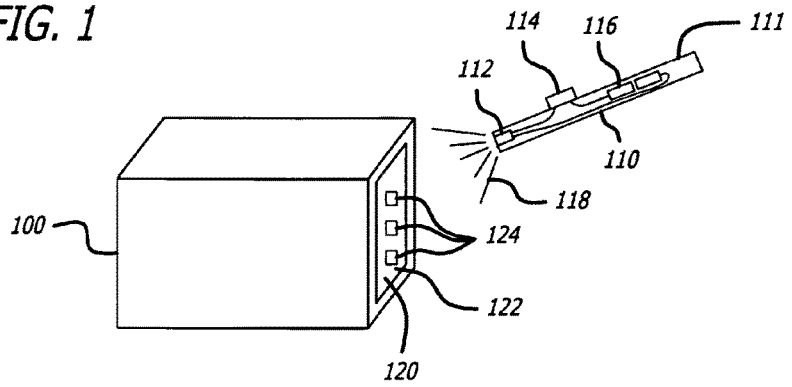
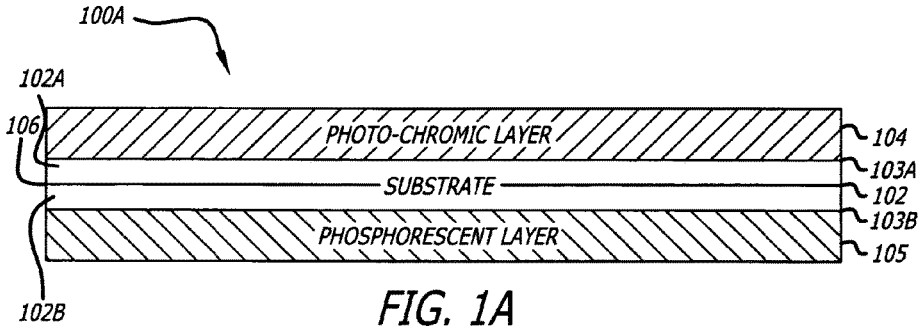
FIG. 1A
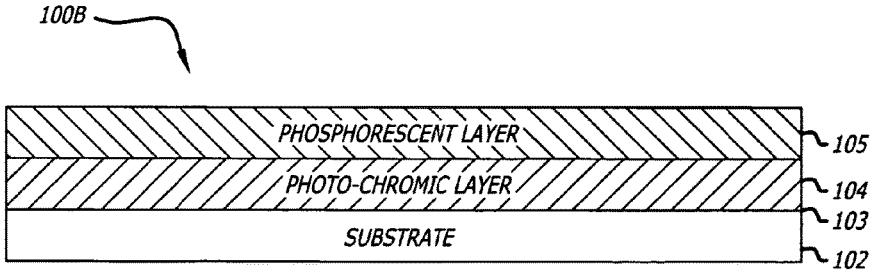
FIG. 1B

FIG. 7A
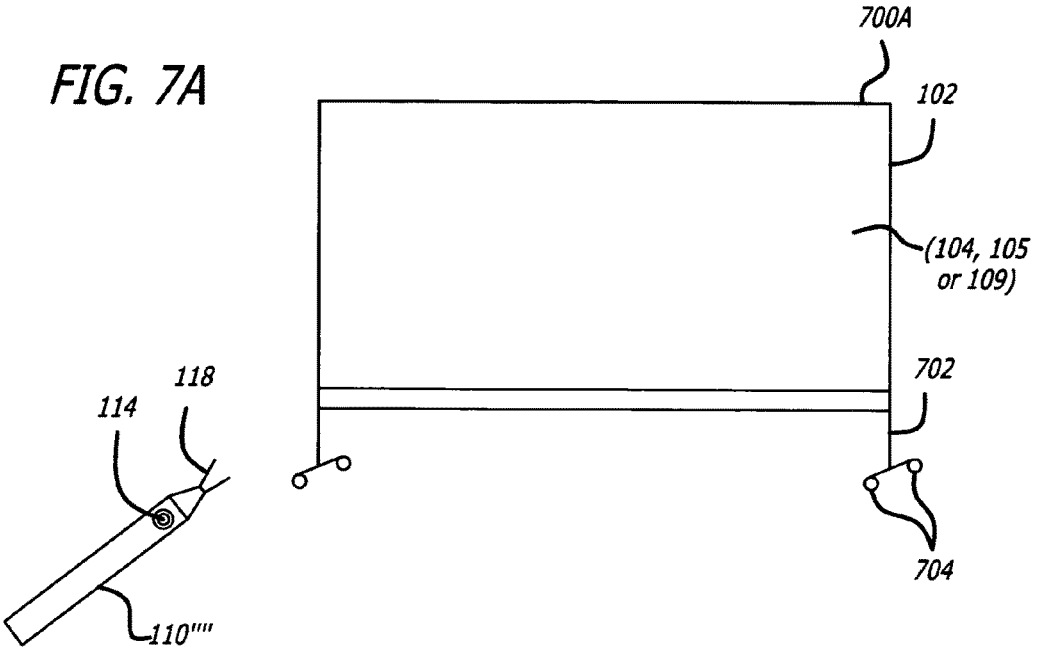
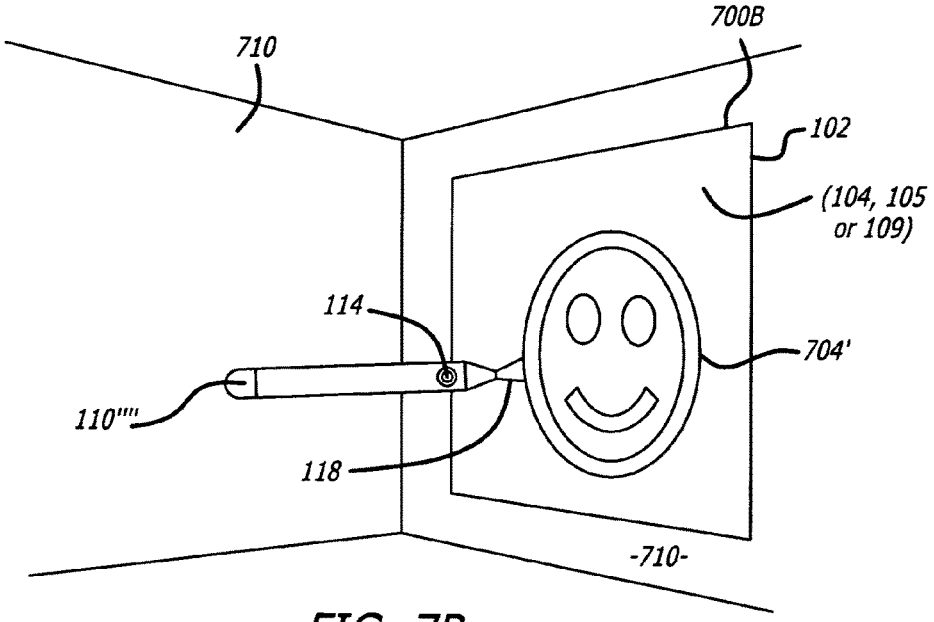
FIG. 7B

FIG. 14A
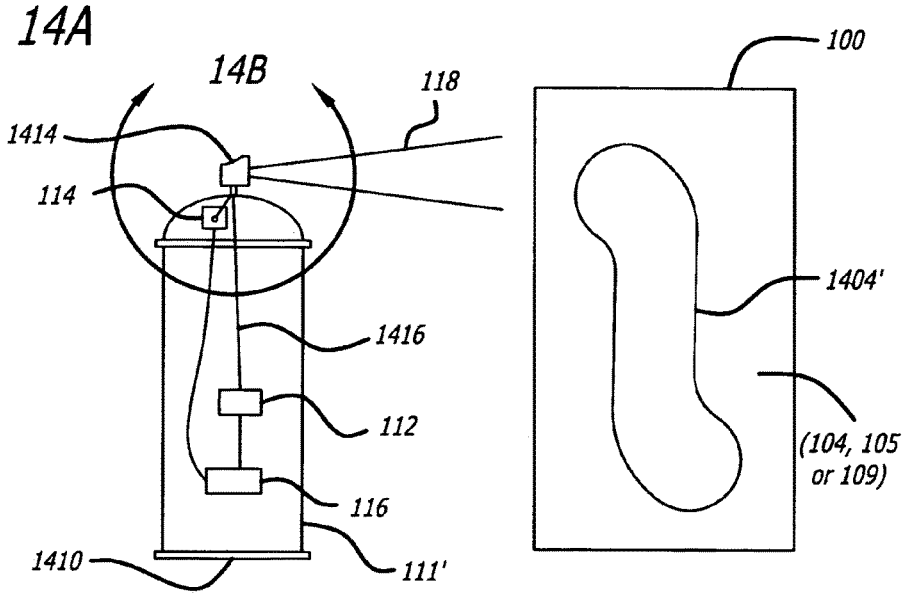
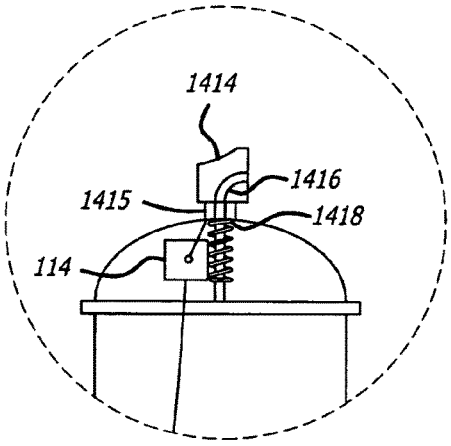
FIG. 14B
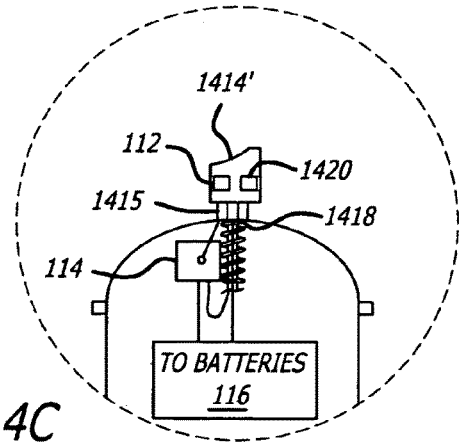
FIG. 14C

PHOTO-CHROMIC AND PHOSPHORESCENT TOYS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit of U.S. Provisional Patent Application No. 60/739,551 filed Nov. 23, 2005 *and U.S. Pat. No. 8,684,784, filed on Nov. 22, 2006. This application is a broadening reissue of U.S. Pat. No. 8,684, 784, issued Apr. 1, 2014, which is incorporated herein by reference*.

FIELD

The embodiments of the invention relate generally to drawing toys. More particularly, the embodiments of the invention relate to light drawing toys.

BACKGROUND

A photo-chromic material is a material that is initially transparent or translucent. The photo-chromic material can be temporarily transformed into being a reflective color by the application of an appropriate spectrum of electromagnetic radiation or light. That is, upon transformation, photo-chromic materials reflect background light and are not transparent or translucent for a period of time.

In contrast, phosphorescent materials, sometimes referred to as glow-in-the-dark materials, absorb electromagnetic radiation to become charged or activated. Upon removal of the electromagnetic radiation source, phosphorescent materials do not reflect, but emit a light of with an intensity that decays over a period of time. The light emitted by phosphorescent materials is typically visible in darkness or low background light conditions for a period of time.

The chemical makeup of photo-chromic materials is well known. For example, photo-chromic materials and compounds may be formed out of naphtacenequinones and derivatives thereof. It is known that various colors may be achieved by using derivatives of naphtacenequinones as is described in U.S. Pat. No. 4,036,805 by Tsujimoto et al. which is incorporated herein by reference.

While the chemical makeup of photo-chromic materials and compounds are well known, the application of photo-chromic materials and compounds to useful products has been rather limited.

One industrial use of photo-chromic materials is to store data in three dimensions in a solid state optical memory or an optical disk of a disk drive to try and increase data density within a given volume of space.

While industrial applications of photo-chromic materials are important, it is also desirable to use photo-chromic materials in other ways.

BRIEF SUMMARY

The embodiments of the invention are summarized by the claims that follow below.

BRIEF DESCRIPTIONS OF THE DRAWINGS

FIG. 1 is a block diagram of a photo-chromic and phosphorescent toy.

FIGS. 1A-1L are different cross-sections of a portion of toys including both photo-chromic and phosphorescent materials.

FIG. 7A illustrates a rollable photo-chromic and phosphorescent drawing board.

FIG. 7B illustrates a wall mountable photo-chromic and phosphorescent drawing board.

FIG. 14A illustrates a side view of a light spray can and the activated photo-chromic and phosphorescent pattern that it can make over a photo-chromic and phosphorescent page.

FIG. 14B illustrates a cross-sectional view of the light spray nozzle including a light pipe or fiber optic cable.

FIG. 14C illustrates a cross-sectional view of the light spray nozzle without a light pipe or fiber optic cable.

DETAILED DESCRIPTION

Figure 1C:
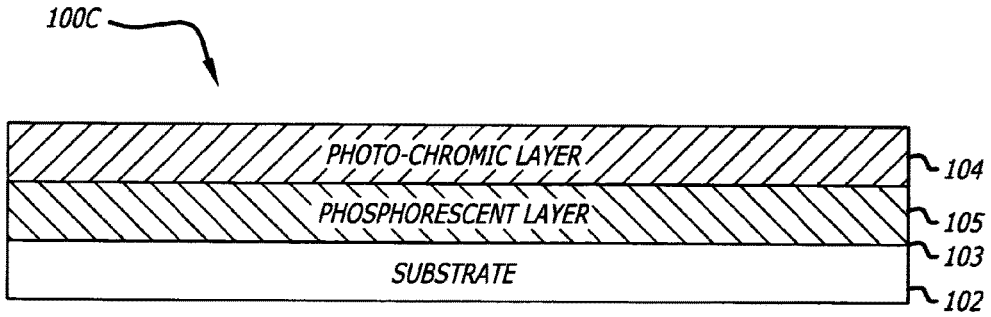

In the following detailed description of the embodiments of the invention, numerous specific details are set forth in order to provide a thorough understanding of the present invention. However, it will be obvious to one skilled in the art that the embodiments of the invention may be practiced without these specific details. In other instances well known materials, methods, procedures, components, systems, and subsystems have not been described in detail so as not to unnecessarily obscure aspects of the embodiments of the invention.

The embodiments of the invention include methods, apparatus, systems, and play-sets for photo-chromic and phosphorescent toys or playthings for children.

Photo-Chromic and Phosphorescent Toys

Referring now to FIG. 1, a block diagram of a photo-chromic and phosphorescent toy 100 is illustrated. The photo-chromic/phosphorescent toy 100 includes a photo-chromic material such as a photo-chromic ink or paint, plastic, or dye and a phosphorescent material. The photo-chromic and phosphorescent materials may be supplied in a material of the toy or applied to a surface of the toy at the factory or it may be applied by a user to the toy or the surface. The photo-chromic and phosphorescent materials may be activated in various ways with various devices.

A photo-chromic ink or paint has a finely divided photo-chromic solid suspended in an ink-like or paint-like carrier. A phosphorescent ink or paint may be similarly formed by using a finely divided phosphorescent solid suspended in an ink-like or paint-like carrier, for example. The photo-chromic/phosphorescent ink or paint is functionally more flexible in that it may be applied by a manufacturer at the factory or by a user outside the factory. In at least one embodiment of the invention, the photo-chromic/phosphorescent ink or paint is in liquid or colloidal form so that it can be applied to a toy or a writing or drawing surface. In other embodiments of the invention, the photo-chromic/phosphorescent ink or paint is dried into a solid on a surface of the toy. In other embodiments of the invention, photo-chromic solids and phosphorescent solids are mixed in with a plastic and molded into the toy at the factory. In other embodiments of the invention, a surface of the toy is dyed at the factory with a photo-chromic/phosphorescent dye.

The photo-chromic/phosphorescent toy 100 may further include a three dimensional structure that is solid or hollow. The structure or portion thereof of the toy may provide a substrate with a surface to which the photo-chromic and phosphorescent materials may be applied.

The photo-chromic/phosphorescent ink or paint is generally activated by light or electromagnetic radiation substantially in or near the violet, or ultraviolet (UV) spectrum. Sunlight can readily activate the photo-chromic/phosphorescent ink or paint. Typical white indoor lighting from incandescent or fluorescent lights doesn't have sufficient intensity in the wavelength range of light or electromagnetic radiation to activate photo-chromic ink or paint but may have enough intensity to activate phosphorescent ink or paint. Thus when indoors or shaded from the sun, a source of violet, or ultraviolet light may be used to activate the photo-chromic element of the ink. When activating and viewing the effects of the phosphorescent ink it is best to activate and view in a relatively dark environment such as a darkened room with no light source from windows or indoor lighting. A light with a wavelength within the spectrum of violet, and ultraviolet light that activates photo-chromic and phosphorescent materials may be collectively referred to herein as an activating light. For example, a black light that provides some UV radiation may be used indoors to activate the photo-chromic/phosphorescent ink or paint.

The photo-chromic material after being activated is transformed into a color and remains so for a period of time typically around sixty seconds. The phosphorescent material after being activated can emit light for a very long period of time although the highest intensity of delayed luminescence degrades after less than sixty seconds.

In other embodiments, a light pen, a light sprayer, a light wand, or a light marker may be used to activate a smaller area of photo-chromic/phosphorescent ink or paint. FIG. 1 illustrates a light pen, a light sprayer, a light wand, or a light marker 110 that may be used to provide an activating light to a smaller area of photo-chromic/phosphorescent ink or paint on the photo-chromic/phosphorescent toy. For convenience, the light pen, light sprayer, light wand, and light marker may be collectively referred to as a light pen 110.

The light pen 110 includes a housing 111 to collectively hold together a light transducer 112, a switch 114, and one or more batteries 116 as a portable unit. The switch 114 switches the power supplied by the batteries 116 to the light transducer 112 ON and OFF to periodically generate the electromagnetic radiation or light 118. When ON, the light transducer 112 converts electrical current into the activating light in the range of wavelengths to activate photo-chromic and phosphorescent materials. The light transducer 112 may be a light bulb, a flash bulb, or a light emitting diode (LED) that can generate the activating light. The structure of the housing 111 may take on different ornamental shapes depending upon the context of the photo-chromic/phosphorescent toy 100. Collectively, the light pen 110 and photo-chromic/phosphorescent toy 100 may form a playset.

In FIG. 1, a stencil 120 may further be used to mask out portions of the activating light to form an activated pattern in the photo-chromic and phosphorescent materials. The stencil 120 includes opaque areas 122 to block the activating light and transparent areas 124 to allow the activating light through to the photo-chromic and phosphorescent materials. The transparent areas 124 may simply be openings in the stencil to allow the activating light through. Collectively, the light pen 110, photo-chromic/phosphorescent toy 100 and stencil 120 may form another playset.

FIGS. 1A-1L illustrate different cross-sections of a portion of toys including both photo-chromic and phosphorescent materials.

Referring now to FIG. 1A, a cross-section of a portion of a photo-chromic/phosphorescent toy 100A is illustrated. The photo-chromic/phosphorescent toy 100A includes a substrate 102 with a photo-chromic layer 104 applied across a first surface 103A of the substrate 102 or a portion thereof and a phosphorescent layer 105 applied across a second surface 103B of the substrate 102 or a portion thereof.

The substrate 102 may be formed of one or more substrate layers 102A-102B that may or may not be laminated together by an adhesive 106. The substrate 102 may be a flexible or a rigid solid. The substrate 102 may be formed out of plastics, papers, woods, metals, combinations thereof, or other known solids. The substrate 102 may be transparent or translucent to allow light to pass through or opaque to block light from passing or to reflect light.

In one embodiment of the invention, the outer surfaces 103A-103B of the substrate 102 may be viewable to the eye so that the so that transformation of the photo-chromic ink or paint is visible to the eye on the first side of the toy while the light emission of the phosphorescent is visible to the eye on the second side of the toy 10A.

Referring now to FIG. 1B, a cross-section of a portion of a photo-chromic/phosphorescent toy 100B is illustrated. The photo-chromic/phosphorescent toy 100B includes a substrate 102 with a photo-chromic layer 104 applied across a first surface 103 of the substrate 102 or a portion thereof and a phosphorescent layer 105 applied across the photo-chromic layer 104 or a portion thereof.

Referring now to FIG. 1C, a cross-section of a portion of a photo-chromic/phosphorescent toy 100C is illustrated. The photo-chromic/phosphorescent toy 100C includes a substrate 102 with a phosphorescent layer 105 applied across a first surface 103 of the substrate 102 or a portion thereof and a photo-chromic layer 104 applied across the phosphorescent layer 105 or a portion thereof.

Figure 1D:
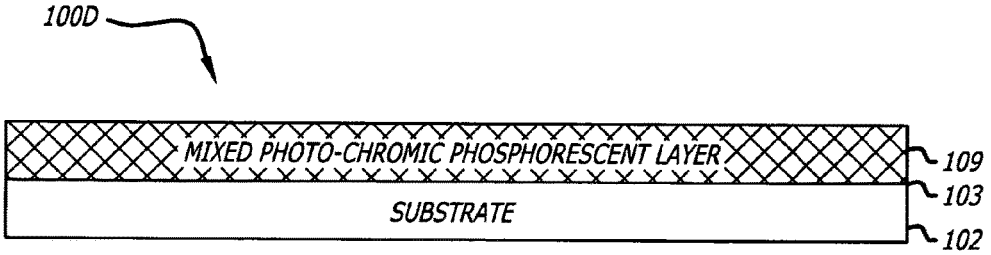

Referring now to FIG. 1D, a cross-section of a portion of a photo-chromic/phosphorescent toy 100D is illustrated. The photo-chromic/phosphorescent toy 100d includes a substrate 102 with a mixed photo-chromic/phosphorescent layer 109 applied across a first surface 103 of the substrate 102 or a portion thereof.

The mixed photo-chromic/phosphorescent layer 109 is a mixture of photo-chromic material and phosphorescent material. In one embodiment of the invention, the mixed photo-chromic/phosphorescent layer 109 is a solution which consists of 50 percent of photo-chromic paint and 50% percent of phosphorescent paint. However, other percentages for each may be used in the solution.

Figure 1E:
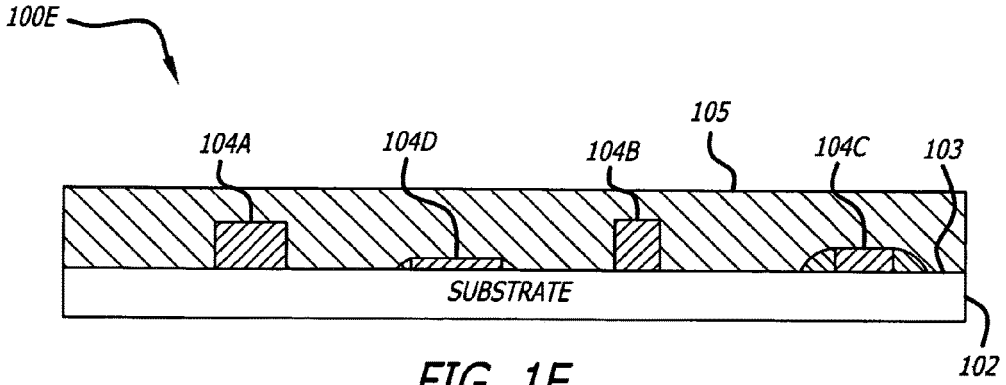
Figure 1F:
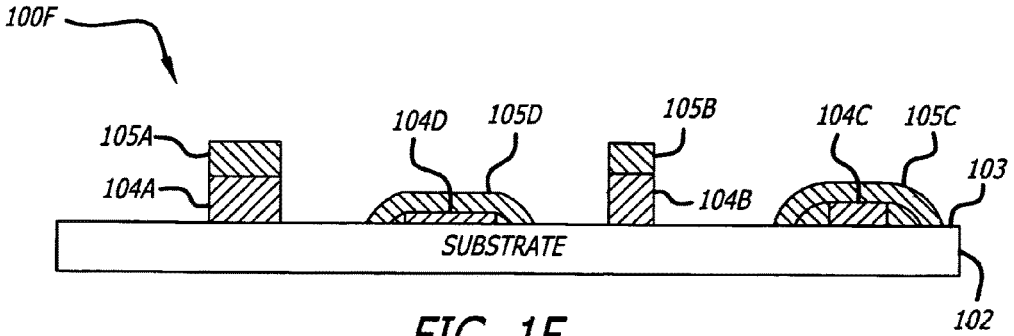
Figure 1G:
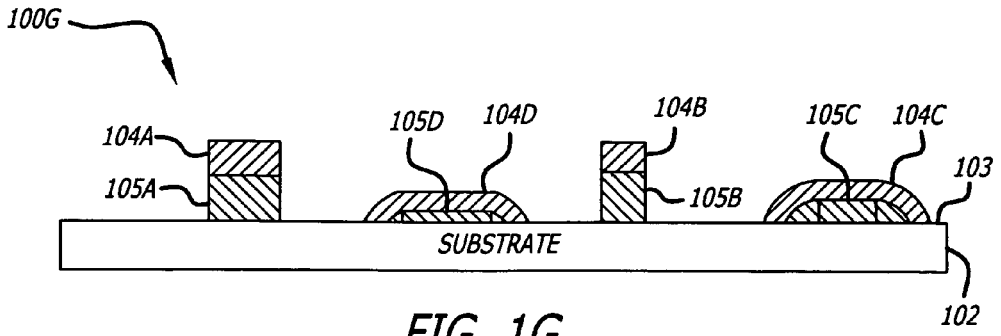
Figure 1H:
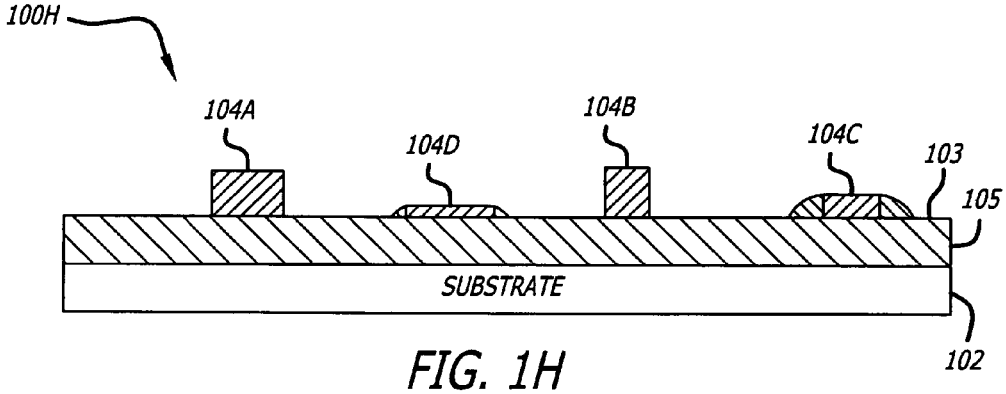
Figure 1I:
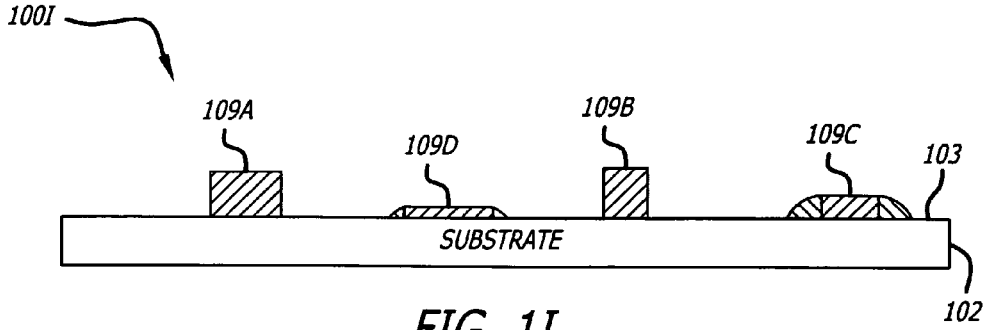
Figure 1J:
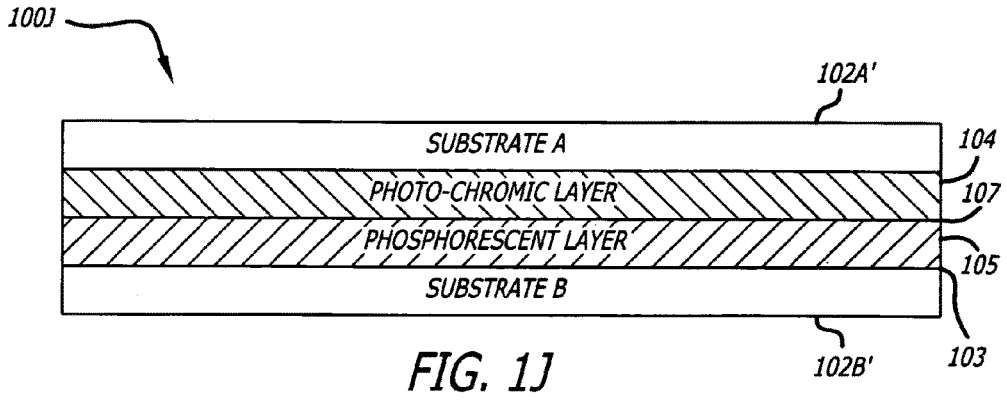

Referring now to FIG. 1J, a cross-section of a portion of a photo-chromic/phosphorescent toy 110J is illustrated. The photo-chromic/phosphorescent toy 100J includes a first substrate layer 102A' with a photo-chromic layer 104 coupled thereto and a second substrate layer 102B' with a phosphorescent layer 105 or a portion thereof coupled thereto. Either one or both of the first and second substrate layers 102A'-102B' are transparent such that the transformation of the photo-chromic layer 104 and light emitted by the phosphorescent layer 105 may be viewable one or both sides of the substrates. The toy 100J may include a gap 107 between the photo-chromic layer 104 and the phosphorescent layer 105 or an adhesive between the photo-chromic layer 104 and the phosphorescent layer 105.

Figure 1K:
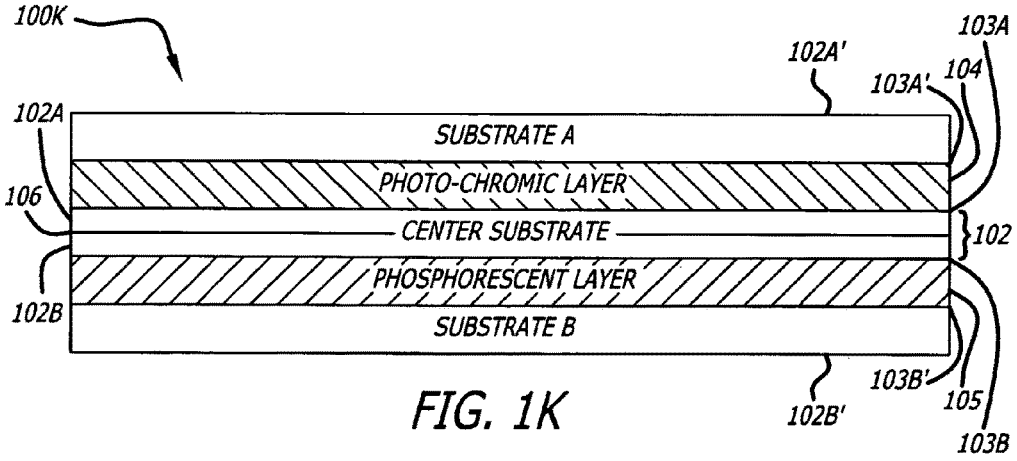
Figure 1L:
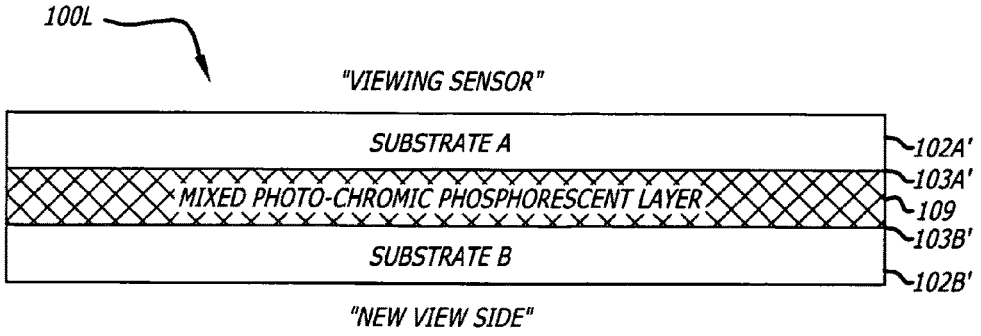

Referring now to FIG. 1K, a cross-section of a portion of a photo-chromic/phosphorescent toy 100K is illustrated. The photo-chromic/phosphorescent toy 100K includes a first outer substrate layer 102A', a photo-chromic layer 104, a central substrate layer, a second outer substrate layer 102B' and a phosphorescent layer 105.

Either one, two or all of the, center, and the first and second outer substrate layers 102, 102A'-102B' are translucent such that the transformation of the photo-chromic layer 104 and light emitted by the phosphorescent layer 105 may be viewable from one or both sides of the toy. Two or more layers of the toy 100K may be laminated together with an adhesive Referring now to FIG. 1L, a cross-section of a portion of a photo-chromic/phosphorescent toy 100L is illustrated. The photo-chromic/phosphorescent toy 100L includes a first substrate layer 102A' and a second substrate layer 102B' with a mixed photo-chromic/phosphorescent layer 109 or a portion thereof sandwiched between the substrate surfaces 103A'-103B'. Either one or both of the first and second substrate layers 102A'-102B' are translucent such that the transformation or light emitted by the mixed photo-chromic/phosphorescent layer 109 may be viewable.

Referring now to FIG. 1E, a cross-section of a portion of a photo-chromic/phosphorescent toy 100E is illustrated. The photo-chromic/phosphorescent toy 100E includes the substrate 102, a pattern of a photo-chromic layer, and a phosphorescent layer over the patterned photo-chromic layer. The pattern of photo-chromic layer 104A-104D is applied at portions of the surface 103 of the substrate 102 in contrast to being applied over the whole portion of the substrate. The pattern of photo-chromic ink or paint 104A-104D may be applied to selected portions of the surface 103 of the substrate 102 through the use of masking techniques such as with a mask, for example. Instead of being patterned, the phosphorescent layer 105 is applied over the substrate 102 and the patterned photo-chromic layer 104A-104D.

Referring now to FIG. 1F, a cross-section of a portion of a photo-chromic/phosphorescent toy 100F is illustrated. The photo-chromic/phosphorescent toy 100F includes the substrate 102, a pattern of a photo-chromic layer, and a pattern of a phosphorescent layer over the patterned photo-chromic layer. The pattern of photo-chromic layer 104A-104D is applied at portions of the surface 103 of the substrate 102 in contrast to being applied over the whole portion of the substrate. The pattern of photo-chromic ink or paint 104A-104D may be applied to selected portions of the surface 103 of the substrate 102 through the use of masking techniques such as with a mask, for example. The pattern of the phosphorescent layer 105A-105D is patterned onto the pattern of photo-chromic layer 104A-104D and or the substrate 102.

Referring now to FIG. 1G, a cross-section of a portion of a photo-chromic/phosphorescent toy 100G is illustrated. The photo-chromic/phosphorescent toy 100G includes the substrate 102, a pattern of a phosphorescent layer, and a pattern of a photo-chromic layer over the patterned phosphorescent layer. The pattern of phosphorescent layer 105A-105D is applied at portions of the surface 103 of the substrate 102 in contrast to being applied over the whole portion of the substrate. The pattern of phosphorescent ink or paint 104A-104D may be applied to selected portions of the surface 103 of the substrate 102 through the use of masking techniques such as with a mask, for example. The pattern of the photo-chromic layer 104A-104D is patterned onto the pattern of phosphorescent layer 105A-105D and or the substrate 102.

Referring now to FIG. 1H, a cross-section of a portion of a photo-chromic/phosphorescent toy 100H is illustrated. The photo-chromic/phosphorescent toy 100H includes the substrate 102, a phosphorescent layer, and a pattern of a photo-chromic layer over the phosphorescent layer. The phosphorescent layer 105 is applied over the surface 103 of the substrate 102. The pattern of the photo-chromic layer 104A-104D is patterned onto the phosphorescent layer 105. The pattern of photo-chromic ink or paint 104A-104D may be applied to selected portions of the phosphorescent layer 105 through the use of masking techniques such as with a mask, for example.

Referring now to FIG. 11, a cross-section of a portion of a photo-chromic/phosphorescent toy 100I is illustrated. The photo-chromic/phosphorescent toy 100I includes the substrate 102, and a mixed phosphorescent/photo-chromic layer 109A-109D patterned over the substrate 102. The pattern of mixed phosphorescent/photo-chromic layer 109A-109D may be applied to selected portions of the substrate 102 through the use of masking techniques such as with a mask, for example.

Generally, the photo-chromic and phosphorescent inks or paints may be applied to surfaces of substrates similar to how inks and paints are applied to surfaces. The shape, width, and thickness of the photo-chromic and phosphorescent inks or paints may vary depending upon how it is applied to the surface 103 of the substrate 102. The pattern of photo-chromic and phosphorescent ink or paint 104A is thicker than the photo-chromic and phosphorescent ink or paint 104D. The photo-chromic and phosphorescent ink or paint 104A is wider than the photo-chromic and phosphorescent ink or paint 104B. The photo-chromic and phosphorescent ink or paint 104A-104B are more sharply defined at the edges than the photo-chromic and phosphorescent ink or paint 104C-104D which are more rounded at the edges.

Figure 2:
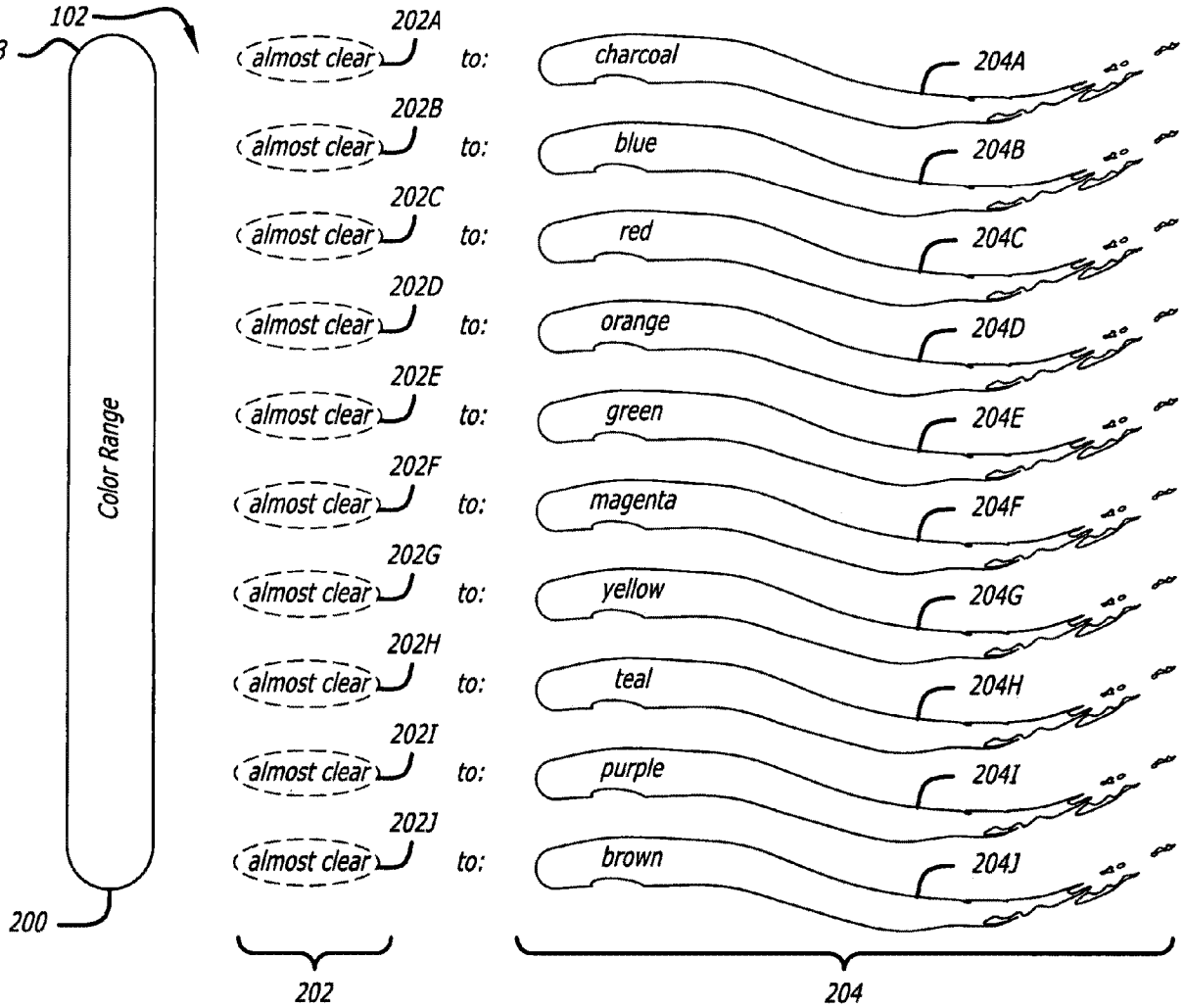
FIG. 2 is a diagram of swatches of photo-chromic ink illustrating their various color when activated and how it may be applied.

Referring now to FIG. 2, exemplary methods are illustrated as to how the photo-chromic/phosphorescent ink or paint may be applied to surfaces of a substrate. FIG. 2 also illustrates the various colors to which photo-chromic ink or paint may change. The photo-chromic/phosphorescent ink or paint may be applied to a substrate by silk screening as illustrated by the oval 200. Alternatively, the photo-chromic/phosphorescent ink or paint may be applied to a substrate by offset printing as illustrated by the ovals 202. Alternatively, the photo-chromic/phosphorescent ink or paint may be applied to a substrate by being sprayed on as illustrated by the brush-strokes or swatches 204.

As discussed previously, the photo-chromic/phosphorescent ink or paint is generally activated by light or electromagnetic radiation substantially in or near the purple, violet, or ultraviolet (UV) spectrum. After being activated, the photo-chromic ink or paint appears to change from being substantially transparent or clear to a color. Alternatively, the color of the photo-chromic ink or paint may appear to change in intensity due to increased reflectivity. Alternatively, the photo-chromic ink or paint may appear to change colors, such as from a substantially white color to a different color other than white. After activation, the change to color, intensity, or different color may persist for approximately thirty seconds, more or less. The persistence of change in the photo-chromic ink or paint may last shorter or longer depending how its activated and for what length of time. Without further activation, the change in the photo-chromic ink or paint may gradually decay back to an inactivated state.

When not activated, in one embodiment of the invention the photo-chromic/phosphorescent ink or paint may be substantially transparent so that it is clear and shows the color of the surface 103 of the substrate 102, as is illustrated by the oval 200. For example, the white color of the surface of the paper substrate shows through the oval 200 of the photo-chromic ink or paint. The surface of the substrate may include indicia or other printing underneath the photo-chromic ink or paint that is revealed when not activated but colored when activated.

When not activated, in another embodiment of the invention the photo-chromic/phosphorescent ink or paint may almost be clear or transparent, somewhat translucent, having a hint of color to distort the color of the surface 103 of the substrate 102, as is illustrated by the ovals 202A-202J. Oval 202A has a hint of charcoal grey color. Oval 202B has a hint of blue color. Oval 202C has a hint of red color. Oval 202D has a hint of orange color. Oval 202E has a hint of green color. Oval 202F has a hint of magenta color. Oval 202G has a hint of yellow color. Oval 202H has a hint of teal color. Oval 202I has a hint of purple color. Oval 202J has a hint of brown color.

When activated, the intensity of the color of the ovals 202A-202J may increase as illustrated by the activated photo-chromic ink or paint of the brush-strokes or swatches 204A-204J, respectively. Brush-stroke 204A is a charcoal grey color. Brush-stroke 204B is a blue color. Brush-stroke 204C is a red color. Brush-stroke 204D is a orange color. Brush-stroke 204E is a green color. Brush-stroke 204F is a magenta color. Brush-stroke 204G is a yellow color. Brush-stroke 204H is a teal color. Brush-stroke 204I is a purple color. Brush-stroke 204J is a brown color.

Additionally, the colors of the photo-chromic ink or paint may be layered on top of one another. A plurality of lines of different colors of the photo-chromic ink or paint may be placed side by side so that a rainbow of colors may be observed by a user when activated.

The photo-chromic/phosphorescent ink or paint may be applied to various types of children's toys and playthings. The photo-chromic/phosphorescent ink or paint may also be activated in different ways by differing light devices. Templates or-masks may be used that have opaque portions to shade areas of the photo-chromic ink or paint from light and activation and open areas through which light can pass so that colored patterns or shapes of activated photo-chromic/phosphorescent areas appear visible.

Figure 3A:
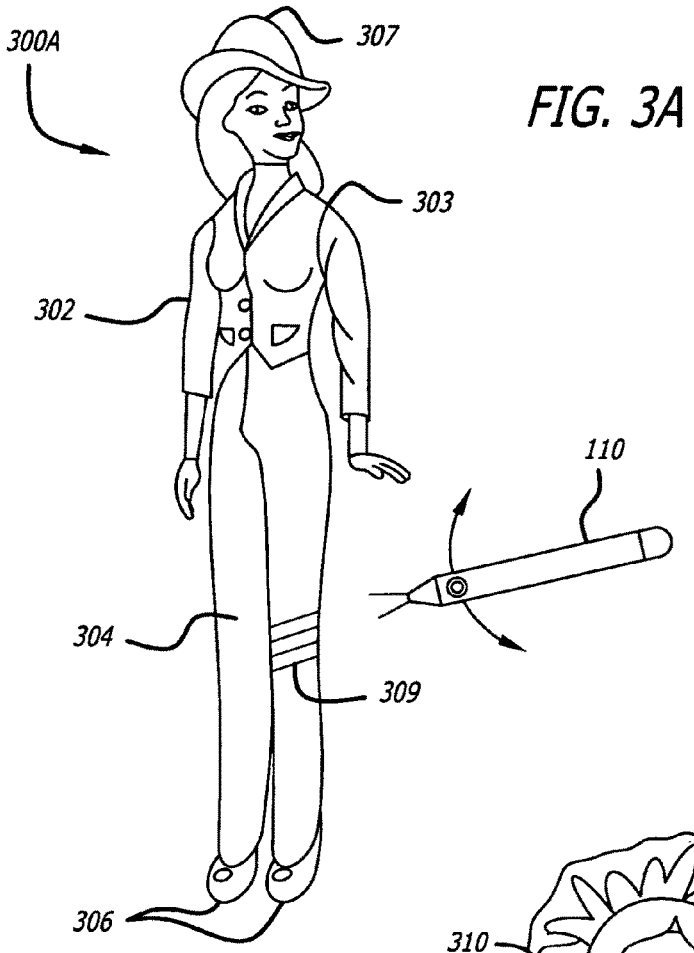
FIGS. 3A-3B are perspective views of photo-chromic and phosphorescent dolls or characters and accessories therefor.
Figure 3B:
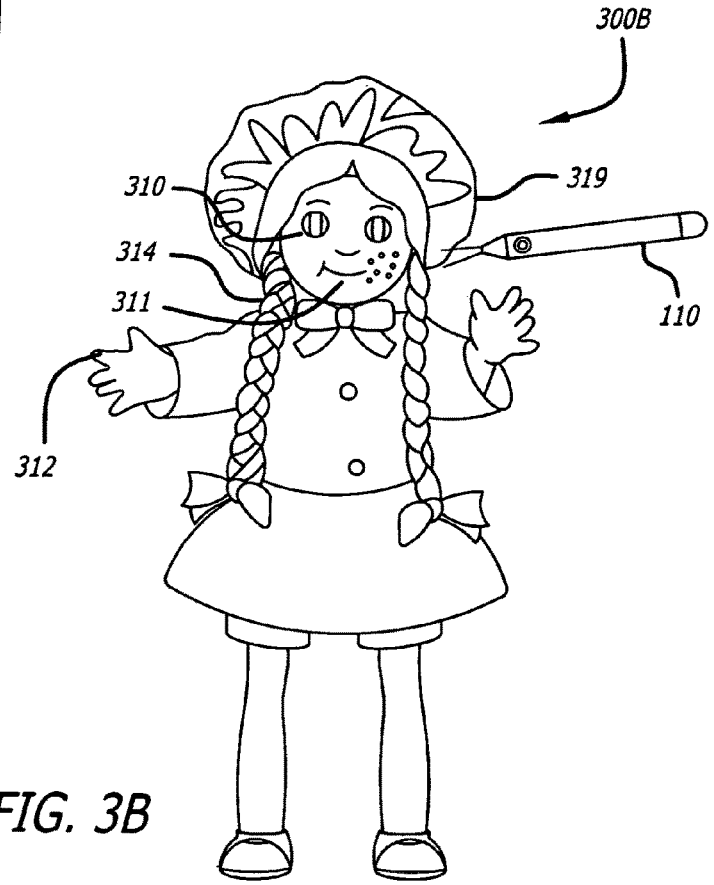

One type of photo-chromic/phosphorescent toy is a doll or character. FIGS. 3A-3B illustrate dolls or characters 300A-300B. In FIG. 3A, a user may use the light pen 110 to activate the photo-chromic and phosphorescent materials that is applied to a doll or characters clothing such as a shirt or blouse 302; jacket or vest 303; and dress, skirt, or pants 304. FIG. 3A illustrates an area 309 of pants 304 on the doll or character 300A being activated by the light pen 110. Other areas of photo-chromic and phosphorescent materials may be activated by moving the light pen 110 along other areas of clothing on the doll or character 300A as illustrated by the arrows. Different colors of photo-chromic and phosphorescent materials may be activated on the clothing of the doll or character. Photo-chromic and phosphorescent materials may also be applied to the accessories for a doll or character such as footwear or shoes 306; and headwear or hats 307, for example.

A light pen 110 with a tightly focused spot activating light may allow a child to doodle or scribble narrow line widths in the photo-chromic and phosphorescent materials on the clothing of the doll or character 300A.

FIG. 3B illustrates a doll or character 300B with photo-chromic and phosphorescent materials applied to body-parts, such as the face 310, hands 312, and the hair 314. The light pen 310 can activate areas 319 of photo-chromic and phosphorescent materials applied to the face 310 as illustrated in FIG. 3B. A child user may use the light pen 110 to emulate the application of make-up to the face 310 or lipstick to the lips 311, for example. With an appropriate color, a child user may use the light pen 110 to make the face 310 blush, for example. Alternatively, a user may use a light pen 110 with a narrow spot beam to show freckles on the face 310 or doodle or scribble on the hands 312 of the doll or character, for example.

In another embodiment of the invention, the photo-chromic and phosphorescent materials are patterned into a mark or tattoo when applied onto the doll or character 300A-300B. A pattern of photo-chromic and/or phosphorescent material, photo-chromic ink 104A-104D, was described previously with reference to FIGS. 1E-1I. The light pen 110 can activate the photo-chromic and phosphorescent materials to make the pattern of the mark or tattoo on the doll or character 300A-300B visible. Alternatively, a template or stencil with a pattern may be used to allow a pattern of light to activate a pattern within the photo-chromic and phosphorescent materials to make a mark or tattoo on the doll or character 300A-300B visible. A stencil 120 having a pattern of opaque areas or openings 124 was described previously with reference to FIG. 1. In either case, the light pen emulates spraying tattoos onto a doll or character.

Note that the function of the doll or characters 300A-300B may be combined into a single doll or character that has photo-chromic and phosphorescent materials applied to both body parts and clothing so that either or both may be activated by a light pen. While the doll or characters 300A-300B are illustrated as being human beings, animal characters, fictional characters may have photo-chromic and phosphorescent materials applied to their bodies and or clothing that can-be similarly activated.

Figure 4:
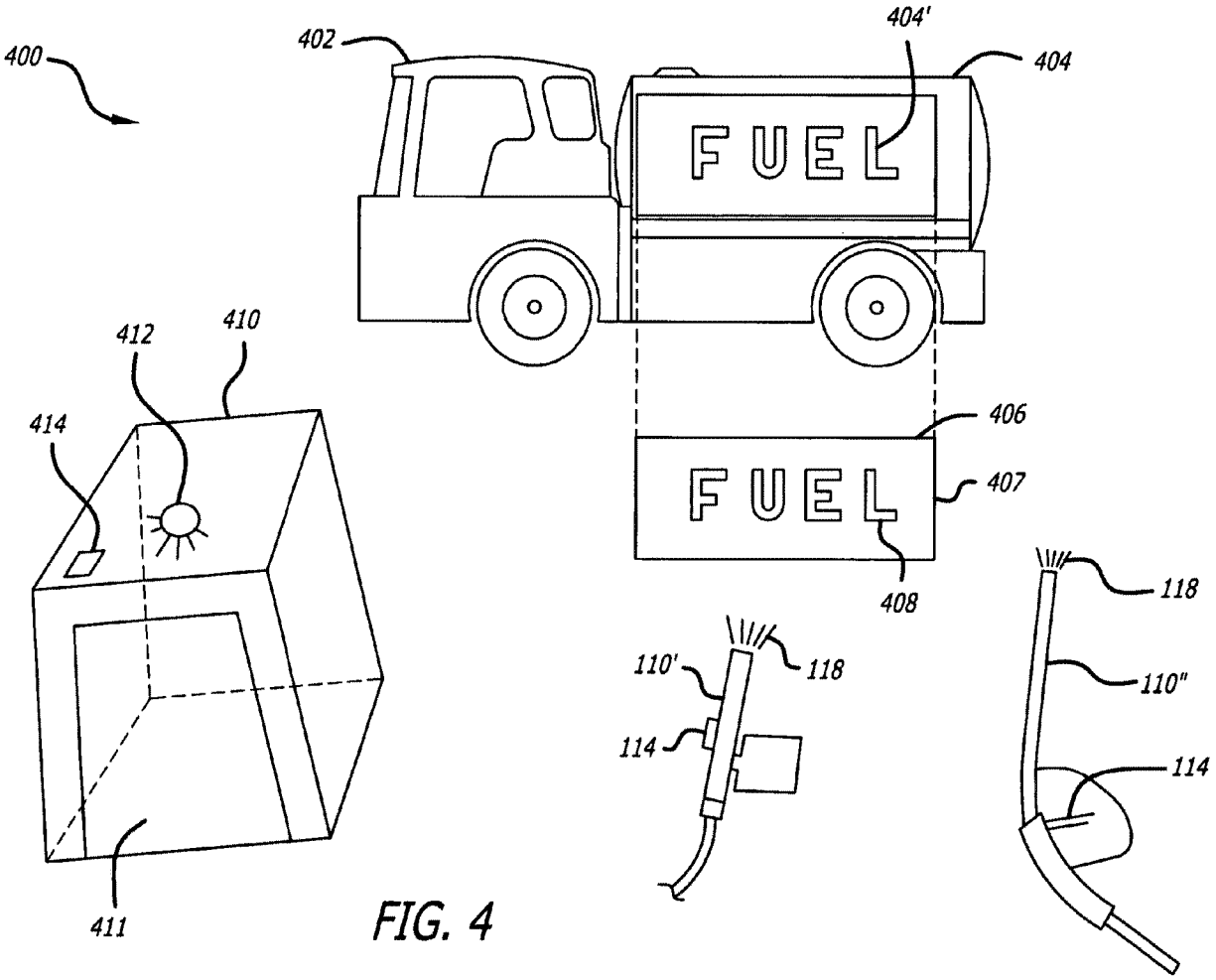
FIG. 4 illustrates views of an exemplary photo-chromic and phosphorescent toy vehicle and accessories therefor.

Referring to FIG. 4, views of an exemplary photo-chromic/phosphorescent toy vehicle play set 400 are illustrated. The play set 400 includes a photo-chromic/phosphorescent toy vehicle 402, such as a car, plane boat, truck, or other type of vehicle. The toy vehicle 402 includes a portion 404 that has photo-chromic and phosphorescent materials, such as the tank as illustrated in FIG. 4. Other portions or the vehicle in its entirety may include photo-chromic and phosphorescent materials.

The play set may further include one or more templates or stencils 406. The stencils 406 include opaque portions 407 and transparent or open portions 408 to activate the photo-chromic and phosphorescent materials. The transparent or open portions 408 may depict anything, including a design or words, such as "FUEL" as illustrated. The stencil is aligned with the photochromic portion 404 of the vehicle and place close to the surface thereof. An activating light is shined through the transparent or open portions 408 of the stencil 406 to activate an activated portion 404' on the vehicle 402 as illustrated.

The playset 400 may further include a light pen 110', 110" and/or a light box 410. The light pen 110' may be ornamental shaped like a spray paint gun 110' that may be used in an auto paint shop. In this case, the light pen 110' emulates the vehicle being painted. The light pen 110' can be used like a "paint sprayer" to spray vehicles different colors or to use templates to spray images on a toy vehicle. Alternatively, the light pen 110" may be shaped like a car wash gun 110" that may be used in a self serve car wash. Using the car wash gun 110" emulates washing the vehicle to clear away the dirt so that the message underneath becomes visible. The switch 114 may be a finger trigger type switch. In any case, the light pen 110',110" generates an activating light 118 in response to turning ON the switch 114.

The playset 400 may further include a light box 410, in addition to a light pen or as a substitute. The light box 410 may be hollow and including an opening 411 in front to roll the vehicle 402 into the light box 410. The light box includes a light bulb 412 and a switch 414 coupled to a power source (e.g., bc, AC, or battery). The light bulb 412 generates the activating light, such as a UV light, in response to the switch in order to flood the inside of the hollow light box. In this manner, all of the photo-chromic portions of the vehicle 402 may be activated at the same time. Alternatively, the stencils 406 may be used to form a pattern in the photochromic portions of the toy vehicle 402 while in the light box. The light box 410 may include ornamentation to depict it as a paint booth-at an auto paint shop or a car wash.

Drawing Apparatus, Playsets and Kits

Figure 5:
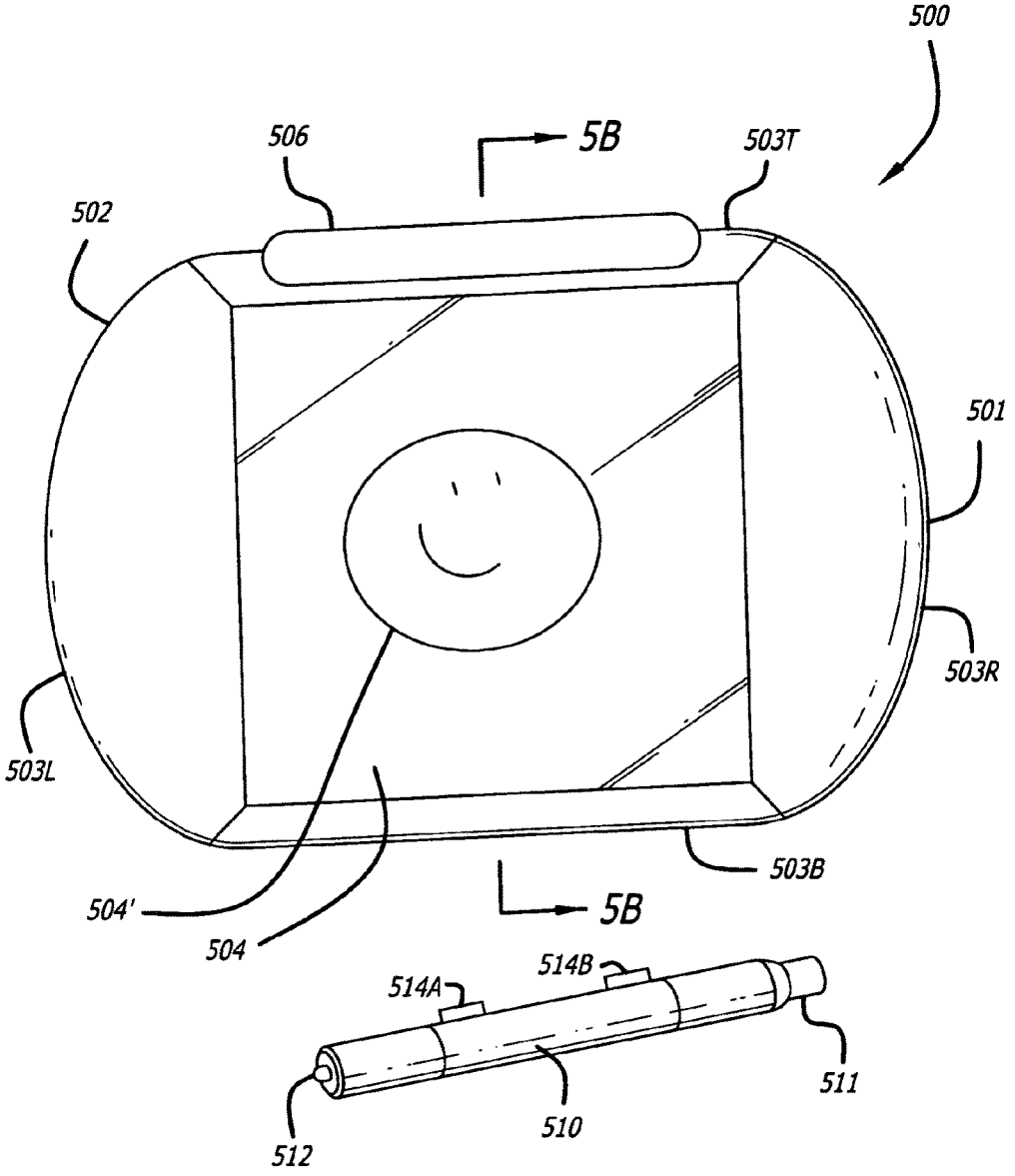
FIGS. 5A-5B are views of an exemplary photo-chromic and phosphorescent drawing toy and light pen.
Figure 5A:
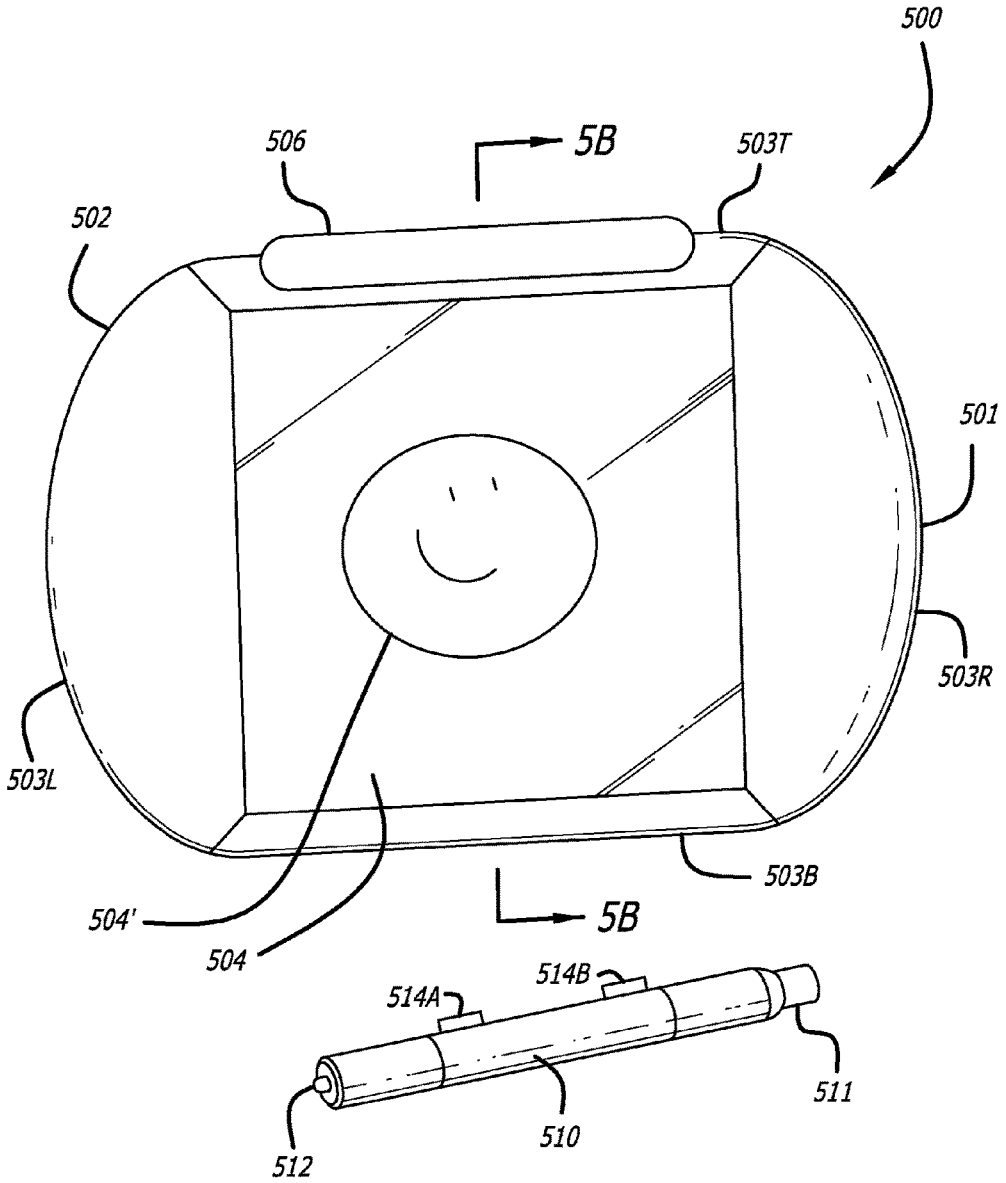

Referring now to FIG. 5A, a top perspective view of an exemplary photo-chromic/phosphorescent drawing toy 500 is illustrated. The toy 500 includes a photo-chromic/phosphorescent drawing tablet 501 and a light pen 510 as illustrated.

The tablet 501 includes a frame or housing 502 with a photo-chromic/phosphorescent drawing slate 504 mounted therein. The slate 504 may include a rigid substrate 102 with one or more layers of photo-chromic and phosphorescent materials such as illustrated in FIGS. 1A-1L and 5B. The frame or housing 502 includes top and bottom-borders 503T, 503B and left and right borders 503L,503R. The frame or housing may further include a logo border 506 coupled to the top border 503T.

Figure 5B:
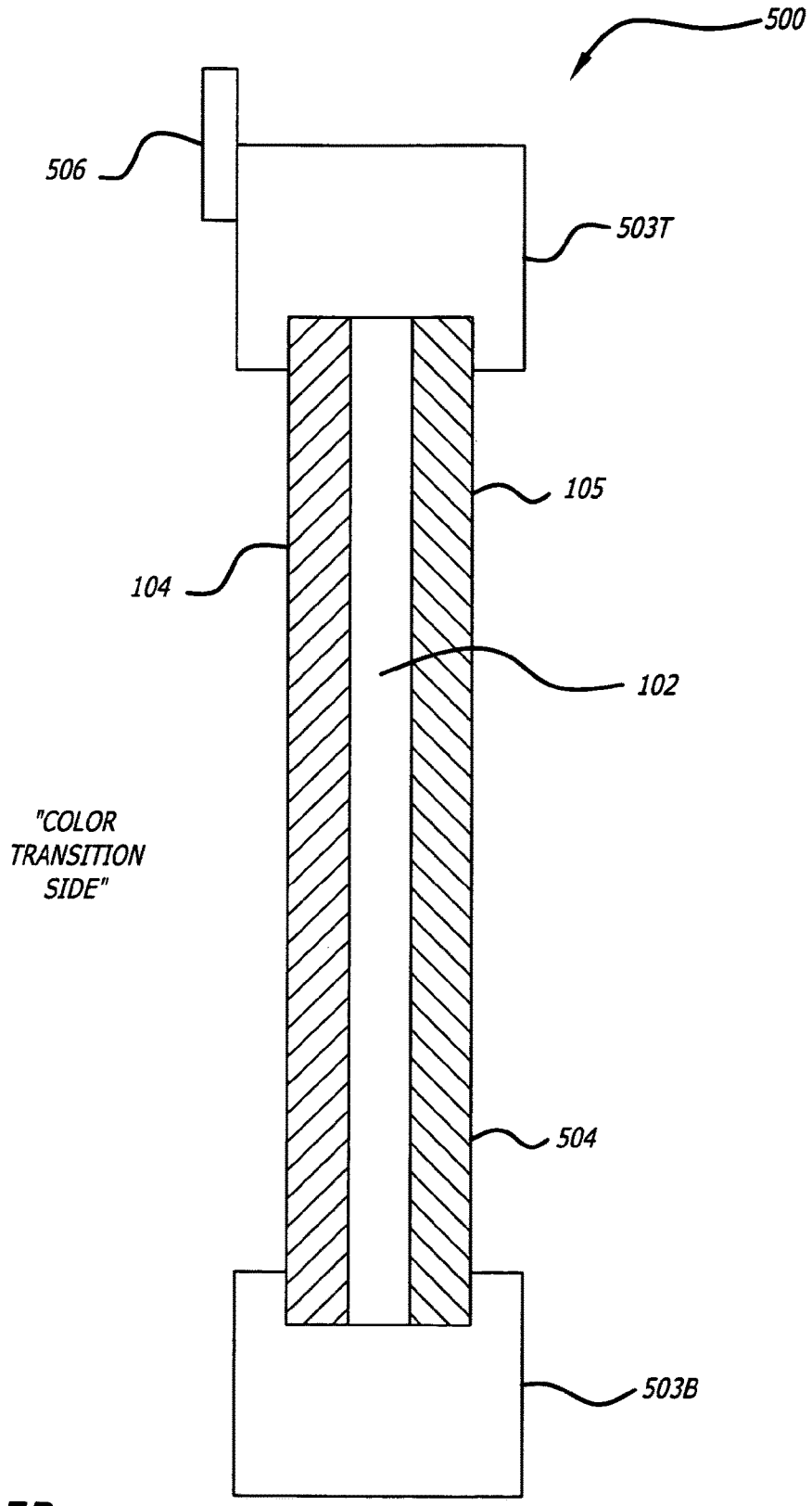

Referring now to FIG. 5B, a cross sectional view of the tablet 501 is illustrated. The photo-chromic/phosphorescent drawing slate 504 has a photo-chromic material 104 coupled to a front side of the substrate 102 and a phosphorescent material coupled to a back side of the substrate 102. The slate 504 may be formed of other layer combinations including one or more layers of photo-chromic and phosphorescent materials, such as illustrated in FIGS. 1A-1L. The tablet 501 has a "color transition side" provided by the photo-chromic material 104 coupled to the substrate 102 and a "glow in the dark side" provided by the phosphorescent material 105 coupled to the substrate 102.

The photo-chromic material is preferably photo-chromic inks that can be offset printed, flex printed or silk screened with any neutral background color desired. The phosphorescent material can also be offset printed, flex printed or silk screened onto a substrate. While FIG. 5A illustrates using a single photo-chromic color, a substrate may be printed using multiple colors in any pattern desirable so that a rainbow color effect may occur when a user doodles and draws. As discussed further below with reference to FIGS. 6B-6C, each different background ink generates a specific color doodle line when the light pen shines its activating light on the background ink.

The light pen 510 may be a dual light pen having two light sources at each end. A first light source 511 provides a point light source focused to within an inch of a page. The first light source 511 is useful to doodle lines. FIG. 5A illustrates an activated photo-chromic region 504' depicting a smiling face doodled onto the slate 504 using the first light source 511. A second light source 512 generates a wide angle of light to provide a "spray paint" like effect on the photo-chromic slate 504. Templates and stencils are better supported using the second light source with the "spray paint" like effect. The light pen 510 further includes a first light switch 514A to turn ON and OFF the first light source 511. The light pen 510 further includes a second light switch 514B to turn ON and OFF the second light source 512. Additional details of the light pen 510 are described below with reference to FIGS. 10A-10B.

While the drawing tablet is illustrated as being shaped flat, it can take on any other shape. For example, instead of a frame and a tablet, the drawing surface may be a three dimensional sphere or cube. The cube or sphere may be mounted to a base instead of mounted within a frame.

Figure 6A:
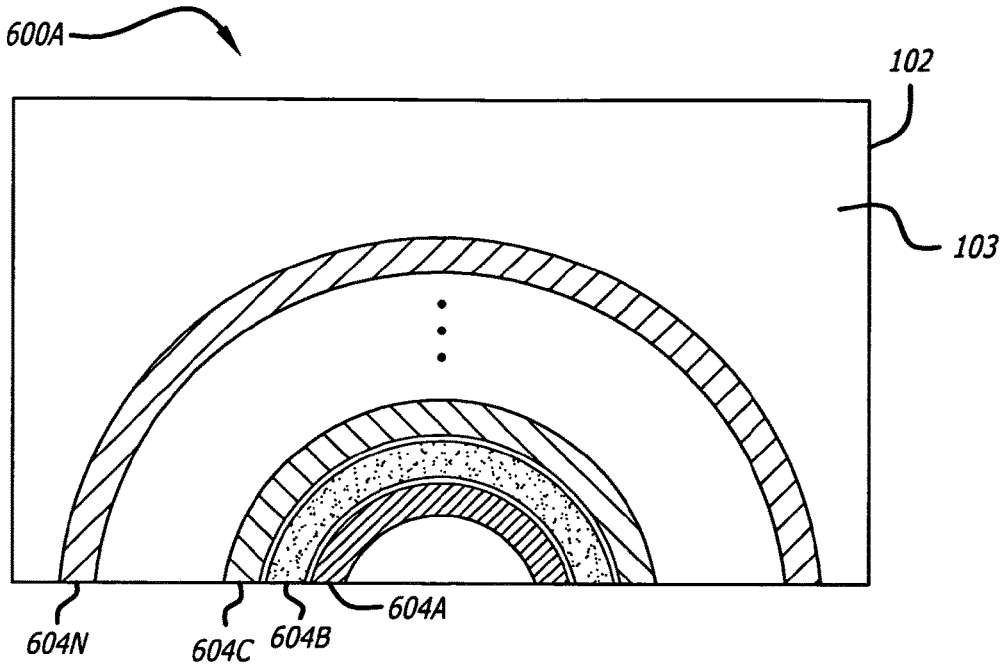
FIG. 6A illustrates multiple colors of photo-chromic/phosphorescent toy arranged in a rainbow pattern over a substrate.

Referring now to FIG. 6A, in a photo-chromic/phosphorescent toy 600A a plurality of photo-chromic/phosphorescent ink colors may be arranged in a variety of patterns over a surface 103 of a substrate 102, including a rainbow pattern or arches in parallel to each other as illustrated. For example, a first arch pattern of photo-chromic/phosphorescent ink 604A may be purple in color when activated. A second arch pattern of photo-chromic/phosphorescent ink 604B may be blue in color when activated. A third arch pattern of photo-chromic/phosphorescent ink 604C may be green in color when activated. An Nth arch pattern of photo-chromic/phosphorescent ink 604N may be red in color when activated.

Figure 6D:
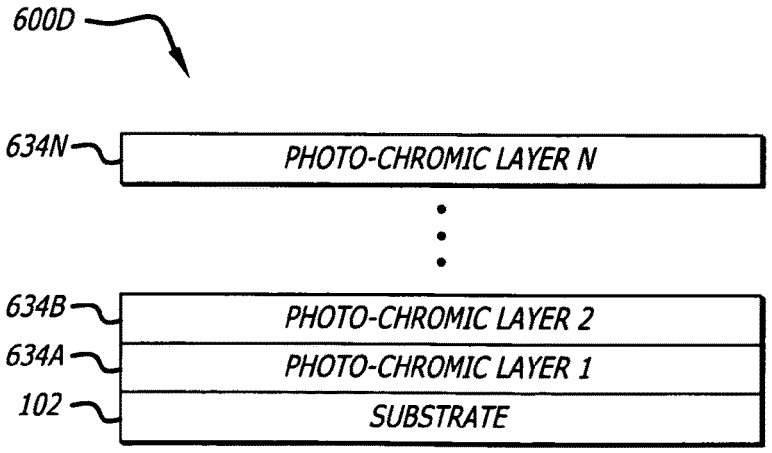
FIG. 6D illustrates stacking multiple layers of photo-chromic/phosphorescent ink over a substrate to achieve a varying color effect.
Figure 6C:
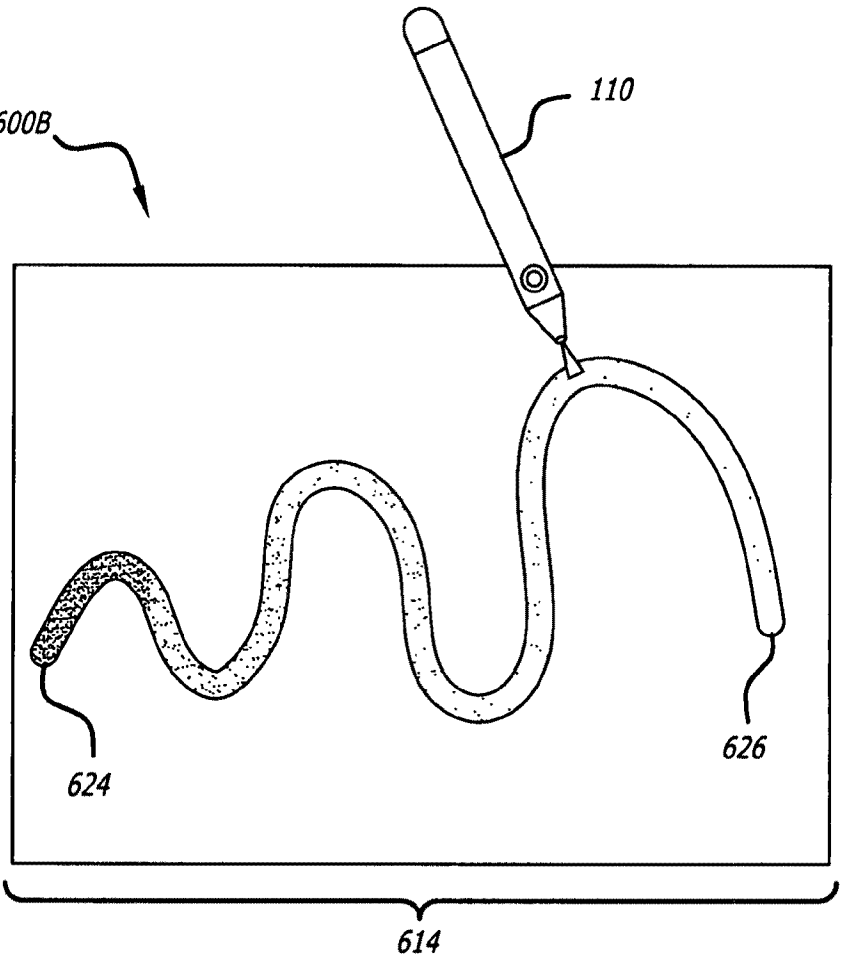
FIG. 6C illustrates a light pen activating multiple colors of photo-chromic/phosphorescent ink illustrated in FIG. 6B.
Figure 6B:
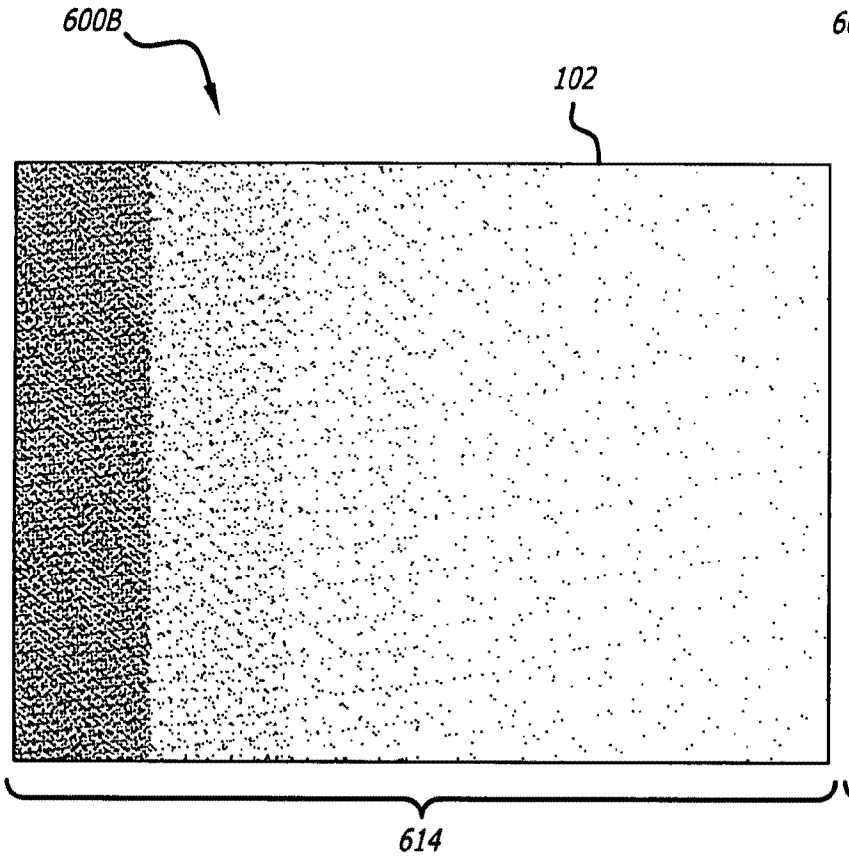
FIG. 6B illustrates a range of multiple colors of activated photo-chromic/phosphorescent ink arranged in a parallel linear pattern over a substrate.

Referring now to FIG. 6B, in a photochromic toy 600B a range 614 of a plurality of colors of activated photo-chromic/phosphorescent inks is illustrated arranged in a parallel linear pattern over a substrate 102. The substrate 102 may be any size including the size of a page, such as 8.5" by 11" for example. After the persistence time of color in the photo-chromic/phosphorescent inks, the range 614 of colors may become clear to reveal the color of the substrate. In this manner with multi-color photo-chromics applied on a substrate, when light activated a rainbow of colors or any subset of a rainbow may be provided.

Referring now to FIG. 6C, a light pen 110 selectively activates portions of the photo-chromic/phosphorescent ink on the substrate 102 of the toy 600B illustrated in FIG. 6B. As the light pen 110 is moved perpendicular to the pattern of color inks, different colors are activated as illustrated. For example, at one end 624 a red color may be activated in a photo-chromic/phosphorescent ink while a purple color may be activated in the photo-chromic/phosphorescent ink at the second end 626 as the light pen 110 moves across the page.

Referring now to FIG. 6D, multiple layers of photo-chromic/phosphorescent ink may be applied over a substrate of a photochromic toy 600D. A first photo-chromic/phosphorescent ink layer 634A is applied onto the substrate 102. A second first photo-chromic/phosphorescent ink layer 634B is then applied onto the first photo-chromic/phosphorescent ink layer 634A and so on and so forth up to the Nth photo-chromic/phosphorescent ink layer 634N. In this case, the upper layers (e.g., photo-chromic/phosphorescent ink layers 634B-634N) are preferably transparent in the inactive state so that the lower layers (e.g., photo-chromic/phosphorescent ink layer 634A). The multiple layers of photo-chromic/phosphorescent ink 634A-634N may also be shaped into a pattern on the substrate 102.

Referring now to FIG. 7A, a rollable photo-chromic/phosphorescent drawing board 700A and light marker 110"" are illustrated. The drawing board 700A mimics a dry marker white board. The drawing board 700A includes a stand 702 with rollers 704. The drawing board 700A further includes a large substrate 102 with layers of photo-chromic 104 and phosphorescent 105 on the substrate. The substrate 102 may have a surface area similar to articles known as white boards or dry-erase boards. The large substrate 102 may be rigidly formed to be supported by a frame in the stand.

As the surface area of the photo-chromic board 700A is relatively large, the area the big light marker 110"" activates at one time is large. The big light marker 110"" may include one or more light sources to provide the larger area of active light output to provide wider or broader pen stroke over the photo-chromic/phosphorescent board 700A.

Referring now to FIG. 7B, a wall mountable photo-chromic/phosphorescent drawing board 700B is illustrated as being mounted to a wall 710. The drawing board 700B includes a large substrate 102 with a photo-chromic layer 104 and a phosphorescent layer on the substrate. Instead of being rigid, the substrate 102 of the drawing board 700B may be flexible so that it may be rolled up into a tube for shipping.

The big light marker 110"" having a wide line width is illustrated as drawing a large happy face pattern in the area of activated photo-chromic/phosphorescent ink 704'. However, other types of light pens may be used to draw on the large photo-chromic/phosphorescent boards 700A-700B.

Figure 8A:
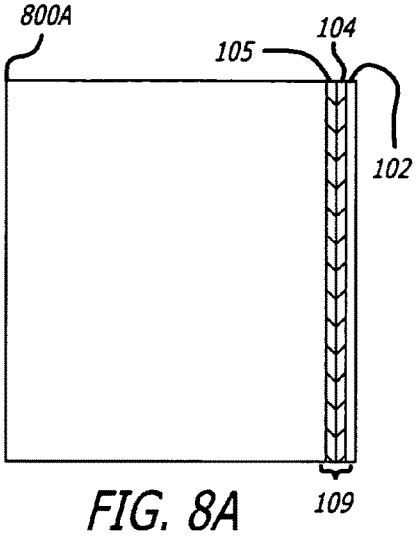
FIG. 8A illustrates a photo-chromic and phosphorescent drawing page.

Referring now to FIG. 8A, a photo-chromic and phosphorescent drawing page 800A is illustrated. The photo-chromic and phosphorescent drawing page 800A includes one or more layers of a substrate 102 (or one or more substrates) and a photo-chromic material layer 104, a phosphorescent material layer 105 or a combined photo-chromic phosphorescent material layer 109 applied over substantially all or a large portion of the area of the substrate 102. The substrate 102 may be flexible or rigid depending upon the material used to form it.

The substrate 102 may be formed out of any solid material to which the photo-chromic and phosphorescent materials adhere. The substrate 102 may be formed out of wood, plastic, metal, or other solid material. Different binders may be provided in the photo-chromic and phosphorescent materials so that it adheres to different surfaces. To apply multiple layers, a photo-chromic material layer, a phosphorescent material layer, or a combined photo-chromic and phosphorescent material layer may adhere to a lower level of photo-chromic, phosphorescent, or combined photo-chromic and phosphorescent material layer.

Figure 8B:
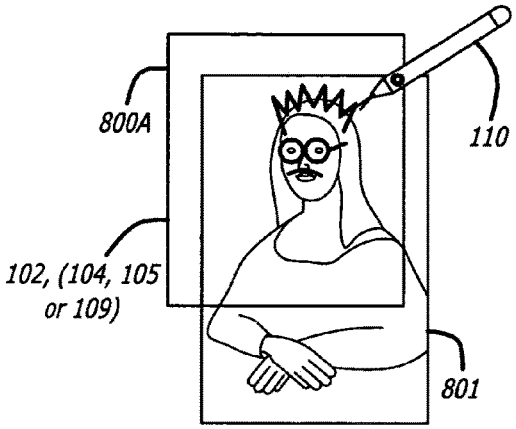
FIG. 8B illustrates a photo-chromic and phosphorescent drawing page of FIG. 8A with a clear substrate to doodle or sketch over artwork.

Referring now to FIG. 8B, in one embodiment of the invention, the substrate 102 is a clear substrate, formed out of a clear acetate material for example, with an inactive transparent photo-chromic/phosphorescent layer 109 applied on a top surface so that objects underneath the page 800A may be clearly visible. FIG. 8B illustrates a photo-chromic/phosphorescent drawing page of FIG. 8A with a clear substrate over artwork 801. A user may to doodle or sketch onto the page 800A over the artwork 801 using the light pen 110 without harm to the artwork 801. The clear photo-chromic/phosphorescent drawing page may be referred to as a photo-chromic/phosphorescent doodling page with the light pen being used to doodle on top of pre-existing art.

While the photo-chromic and phosphorescent materials may be applied over large portions of the page, they may also be patterned to specific areas.

Figure 8C:
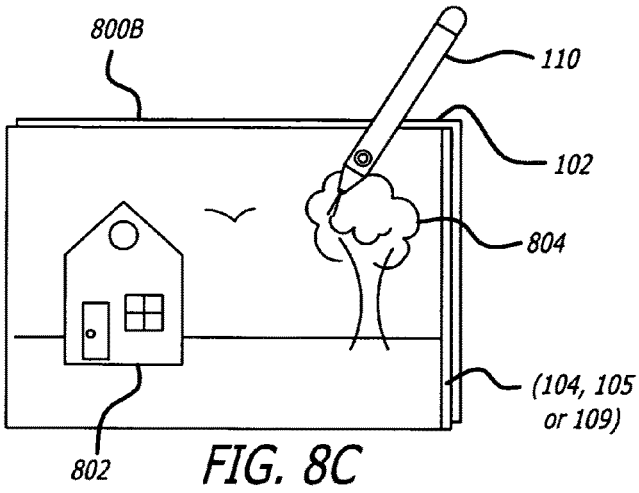
FIG. 8C illustrates a patterned photo-chromic and phosphorescent doodle starter or coloring page with visible printed lines.

Referring now to FIG. 8C, a patterned photo-chromic/phosphorescent doodle starter or coloring page 800B is illustrated. The page 800B includes visible printed lines or printed areas 802 formed out of standard ink and photo-chromic/phosphorescent lines or areas 804 printed using a combined photo-chromic and phosphorescent 109 on the substrate 102. The light pen 110 may then be used to shine an activating light onto the photo-chromic/phosphorescent lines or areas 804 so that they become temporarily visible on the page 800B. In the doodle starter 800B a starting image is printed on paper or other substrate and the child can then use a light pen to activate photo-chromic and phosphorescent materials also printed on the page to add further images to the starting image.

Figure 8D:
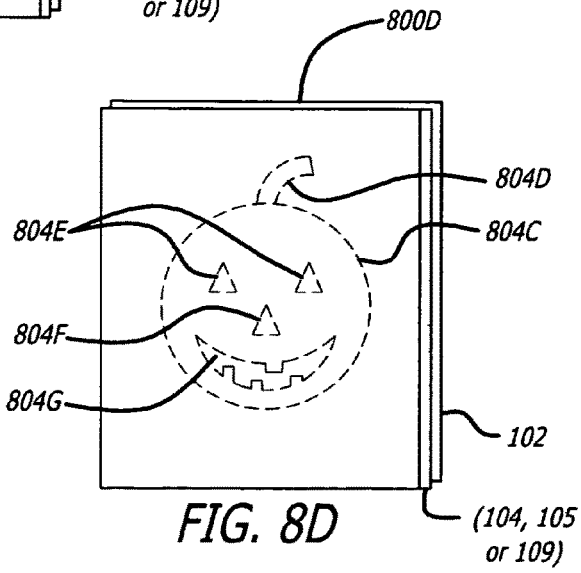
FIG. 8D illustrates a patterned photo-chromic and phosphorescent doodle or coloring page.

Referring now to FIG. 8D, a patterned photo-chromic/phosphorescent doodle or coloring page 800D is illustrated. The page 800D is without ordinary visible printed lines or printed areas so that an image is not visible until the photo-chromic or phosphorescent material is activated. The page 800D includes a photo-chromic and phosphorescent ink 804C to transition to a first color, a second photo-chromic/phosphorescent ink area 804D to transition to a second color, a third photo-chromic/phosphorescent ink area 804E to transition to a third color, a fourth photo-chromic/phosphorescent ink area 804F to transition to a fourth color, and a fifth photo-chromic/phosphorescent ink area 804G to transition to a fifth color. The photo-chromic/phosphorescent ink areas 804C-804G may be applied in a pattern on the page to reveal a design when activated, such as a pumpkin as illustrated.

Figure 9A:
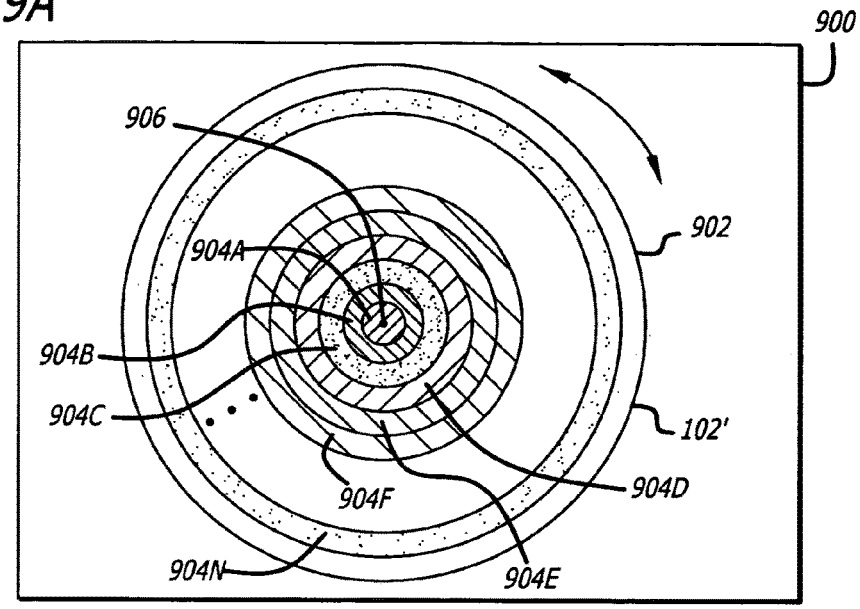
FIG. 9A illustrates a drawing table with a rotatable patterned multicolor photo-chromic and phosphorescent disk.

Referring now to FIG. 9A, a drawing table 900 with a rotatable patterned multicolor photo-chromic/phosphorescent disk 902 is illustrated. The photo-chromic/phosphorescent disk 902 has N concentric rings 904A-904N of photo-chromic/phosphorescent ink applied to a circular shaped substrate 102'. Each of the N rings 904A-904N may be a different shade or hue of color. The N rings may also be N concentric circles each having a different radius from the center axis 906.

The photo-chromic/phosphorescent disk 902 may be rotatably coupled to the drawing table 900 at an axis 906 around which it can rotate as indicated by the arrows. The photo-chromic/phosphorescent disk 902 may be spun by hand or an electric motor may be used to spin the disk. The electric motor may be coupled to the center axis to spin the disk. Alternatively, the electric motor may couple to the disk through two or more gears or a belt and a pair of pulleys.

Figure 9B:
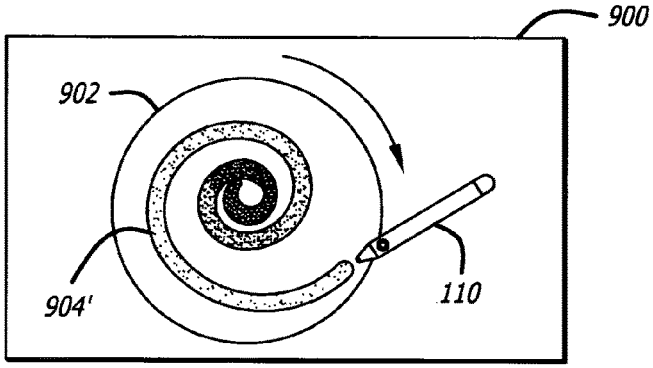
FIG. 9B illustrates using a light pen to activate the rotating photo-chromic and phosphorescent disk of FIG. 9B.

Referring now to FIG. 9B, a light pen 110 is used to activate the rotating photo-chromic/phosphorescent disk 902 of FIG. 9A. The activating light may activate both photo-chromic material and phosphorescent materials in varying shapes and colors depending upon how the light pen 110 is moved over the spinning disk 902.

While both materials may be activated at once (e.g., on the same side of a substrate, transparent substrate) by an activating light, only one may be visible depending upon the ambient lighting. For example, in darkness or low level light, a light is emitted by the phosphorescent material and is visible. However, the transformed color of the photo-chromic material may not be visible in darkness or low level light. In brighter room lighting or outdoor sunlight, the transformed color of the photo-chromic material is visible reflecting room lighting of the transformed color. However, a light emitted by the phosphorescent material may not be visible in brighter room lighting or outdoors in sunlight.

As the disk 902 spins on the desktop 900, a child applies an activating light with a light pen 110 to activate the colors in the spinning disk. The rings or concentric circles of photo 7 chromic/phosphorescent material or portions thereof will appear in response to the activating light.

Figure 9C:
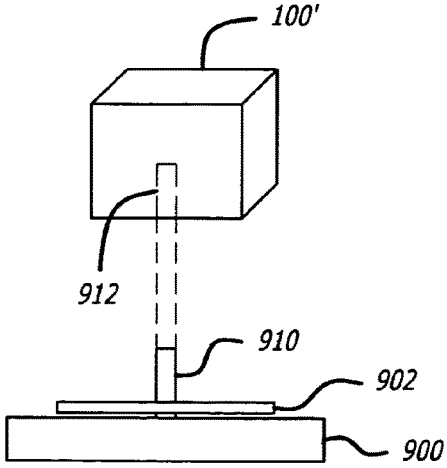
FIG. 9C illustrates a side view of another embodiment of a drawing table with a rotatable disk.

Referring now to FIG. 9C, in another embodiment of the invention, the drawing table 900 may include a spindle 910 at the center 906 of the disk 902. Photo-chromic/phosphorescent toys 100' may include a spindle opening 912 to receive the spindle 910. The photo-chromic/phosphorescent toy may be placed over the spindle 910 and rotated with the disk 910 around the drawing table 900 so that it may be painted in activation light as it rotates.

Light Activating Apparatus

Figure 10A:
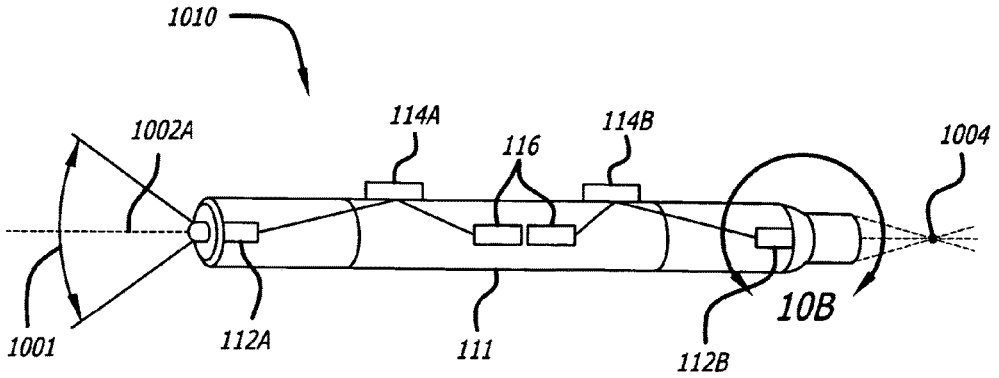
FIG. 10A illustrates a double ended light pen with differing light patterns at each end.

Referring now to FIG. 10A, a double ended light pen 1010 is illustrated to generate different patterns of activation light at each end. The light pen 1010 includes a first UV LED 112A at a first end and a second UV LED 112B at a second end opposite the first. Without additional optics, the first UV LED 112A can generate a wide angle spray of activation light 1001 around an optical axis 1002A to provide a spray effect over a photo-chromic/phosphorescent toy. The wide angle spray of activation light 1001 is particularly use full with templates or stencils as previously described. The second UV LED 112B has optics within its optical axis 1002 so that a point source of activation light 1004 can be generated at a focal point F distance away from the LED 112B along the optical axis. The point source of activation light 1004 is particularly use full in doodling or scribbling letters and words on a photo-chromic/phosphorescent toy.

The light pen further includes batteries 116 as a power source with a pair of switches 114A-114B mounted in the housing coupled between the batteries and the respective LEDs 112A-112B. The switch 114A switches power ON and OFF to the LED 112A. The switch 114B switches power ON and OFF to the LED 112B. A variety of types of switches may be used for switching the activation light on and off in the light pens. In one embodiment of the invention, the switches are momentary push button switches. A user presses and holds a button of the momentary push button switch to turn ON the activation light.

Figure 10B:
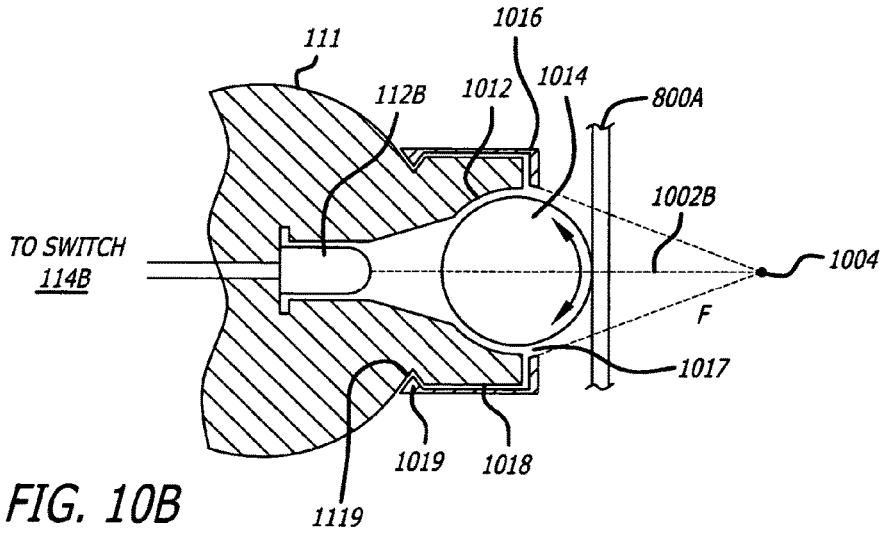
FIG. 10B illustrates an magnified cross-sectional view of one end of the light pen that provides a point light source of activation light.

Referring now FIG. 10B, a magnified cross-sectional view of the end of the light pen with the second UV LED 112B is illustrated. FIG. 10B illustrates exemplary optics that may be used to generate a point source of activation light. The light pen 1010 includes a hemispherical opening 1012 in the end of the housing 111 to receive a ball lens 1014. A cap 1016 is fitted over cylindrical shoulder portion 1018 of the end of the housing to retain the ball lens 1014 within the opening 1012. The cap 1016 includes-an opening 1017 concentric with the optical axis 1002B that allows a portion of the ball lens 1014 to protrude through and roll within the hemispherical opening 1012. Thus, the ball lens 1014 may also be referred to as a rollable ball lens. The cap 1016 may be glued to the portion 1018. Alternatively, the cap 1016 may be friction fitted to the portion 1018. In yet another embodiment, the cap 1016 may include an inner ring-like ridge 1019 that couples into a ring-like recess 1119 in the shoulder portion 1018 of the housing.

As discussed previously, the rollable ball lens 1014 can roll within the hemispherical opening 1012 so that it is rotatably coupled to the housing 111 as is illustrated by the arrows. With the light focused to a point, the ball lens 1014 can be pressed up against a photo-chromic/phosphorescent surface such as found in a photo-chromic/phosphorescent toy 100 or a photo-chromic/phosphorescent page 800A and roll across its surface, activating the photo-chromic/phosphorescent material therein over a narrow region. The rollable ball lens 1014 reduces the friction that the light pen might otherwise face if it was pressed against and moved across a page. That is, the light pen 1010 with its rollable ball lens 1014 can move like a roller ink pen across the page 800A Referring now to FIG. 11A, a set of N light pens 1110 aligned in parallel together in a row within a case 1102 is illustrated. Each of the N light pens 1110A-1110N in the set can provide a range of line widths in the output activation light to vary the area of activation of photo-chromic/phosphorescent material. Light pen 1110A may provide a narrow line width output while light pen 1110N may provide a wide line width output. In other embodiments, the set of light pens may each provide a different stencil design or different diameters of a point source of light.

Figure 11A:
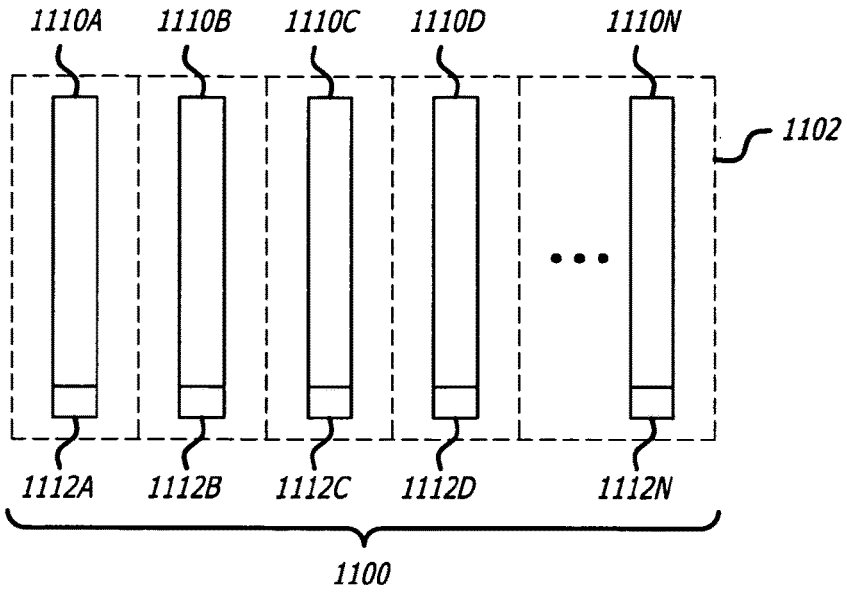
FIG. 11A illustrates a set of light pens in a row, each providing a different line width to vary the area of activation of photo-chromic and phosphorescent materials.
Figure 11B:
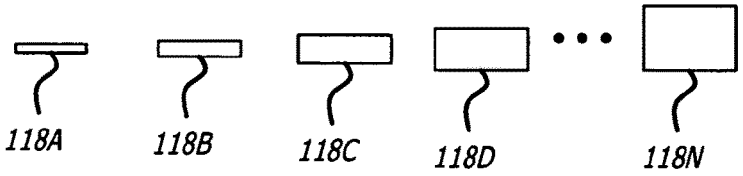
FIG. 11B illustrates exemplary line widths that may be provided by the set of light pens illustrated in FIG. 11A.

FIG. 11B illustrates exemplary line widths in activation light 118A-118N that may be provided by the respective light pens 1110A-1110N of the set 1110 illustrated in FIG. 11A.

Figure 11C:
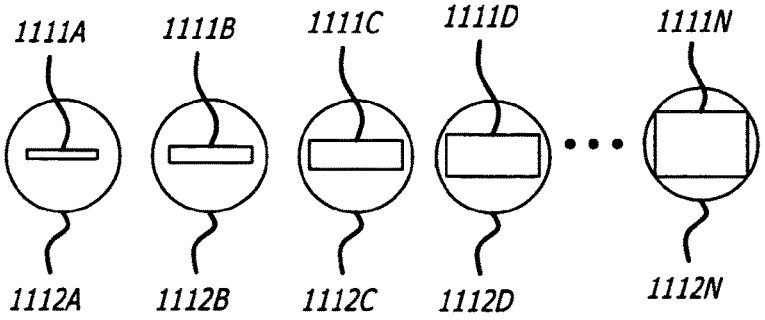
FIG. 11C illustrates exemplary openings or slits in the respective nozzles at the end of each light pen to generate the light patterns illustrated in FIG. 11B.

FIG. 11C illustrates exemplary openings or slits 1111A-1111N in the respective nozzles 1112A-1112N at the end of each respective light pen 1110A-1110N to generate the light patterns of line widths illustrated in FIG. 11B.

Figure 12A:
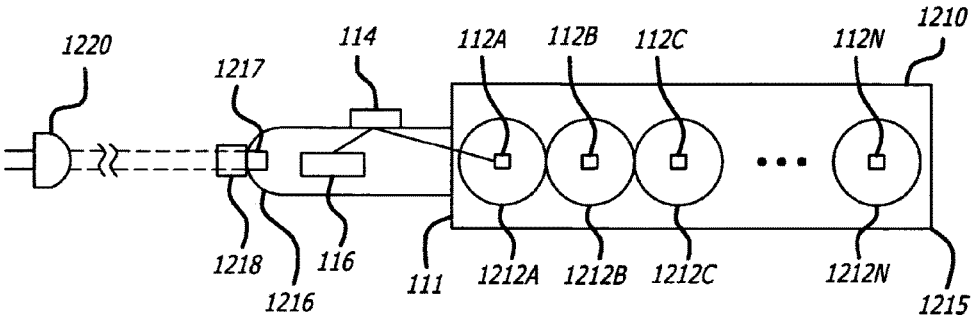
FIG. 12A illustrates a bottom view of a light wand having multiple activating light sources in parallel together.

Referring now to FIG. 12A, a bottom view of a light wand 1210 is illustrated. The light wand 1210 includes a plurality of N activating light sources 112A-112N aligned in parallel together within a row. The light sources 112A-112N are mounted into a head 1215 of the housing 111. In a preferred embodiment of the invention, the light sources 112A-112N are UV LEDs. The light wand 1210 with its multiple light sources may activate photo-chromic/phosphorescent material in such as way to generate a 'wipe' effect over a photo-chromic/phosphorescent page 800A.

The light wand further includes a handle 1216 coupled to the head 1215 having a switch 114 to turn ON and OFF the activation light generated by the light sources 112A-112N. The handle may further include one or more batteries 116 that couple power to the switch 114.

The light wand 1210 may further include a female plug 1217 to receive a male plug 1218 of a cable 1219 to couple to a battery eliminator 1220. The female plug 1217 can switch out the batteries 116 when the male plug 1218 is coupled therein and couple the battery eliminator 1220 to the switch 114. The battery eliminator 1220 plugs into an AC power outlet and may be an AC-to-DC transformer.

Figure 12B:
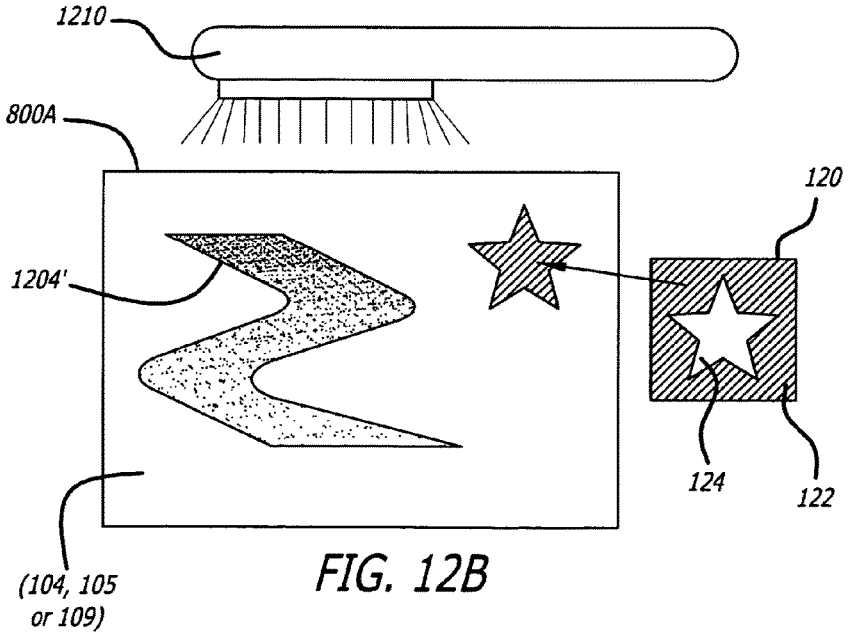
FIG. 12B illustrates a side view of the light wand of FIG. 12A being used over a photo-chromic and phosphorescent page and stencil.

FIG. 12B illustrates a side view of the light wand 1210 of FIG. 12A being used over a photo-chromic/phosphorescent page 800A. The light wand 1210 can activate a wide stripe 1204' of photo-chromic and/or phosphorescent materials with one swipe as illustrated. The light wand may readily be used with a stencil or template 120 that can cover the whole page. A couple of swipes of the light wand over the page 800A and the openings 124 in the stencil 120 can quickly be used to activate the underlying photo-chromic and/or phosphorescent materials on the page. That is, the light wand with the multiple light sources in a row to creates more light so that bigger templates may be used to wipe across the template.

Figure 13:
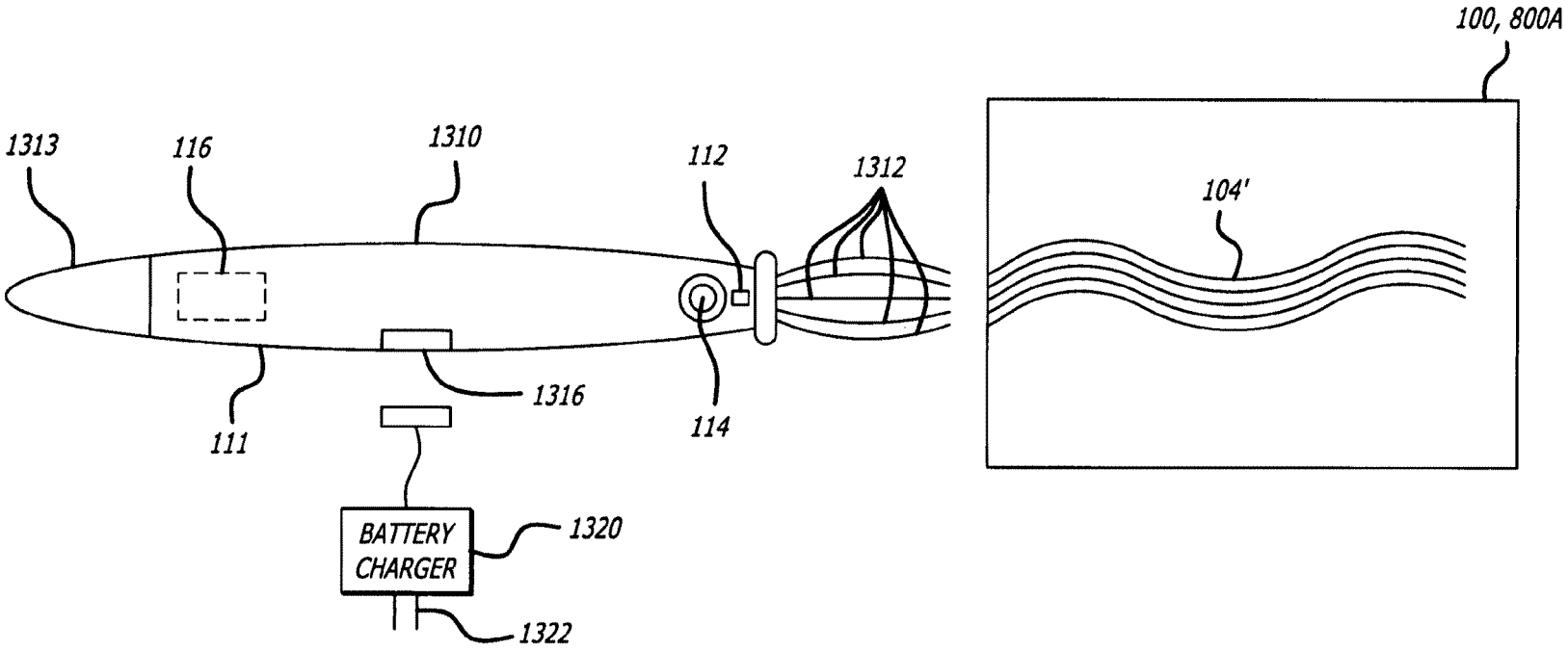
FIG. 13 illustrates a top view of a light paint brush and the activated photo-chromic and phosphorescent pattern that it can make over a photo-chromic and phosphorescent page.

Referring now to FIG. 13, a top view of a light brush 1310 is illustrated. The light brush includes a plurality of light pipe or fiber optic bristles 1312 at one end. The distal end of each of the fiber optic bristles 1312 can separately output an activation light beam at a different point in space and on the photo-chromic/phosphorescent toy 100 or photo-chromic/phosphorescent page 800A. The parallel tracks of activated photo-chromic/phosphorescent material 104' on page 800A illustrated in FIG. 13 shows the activated photo-chromic/phosphorescent pattern that fiber optic bristles 1312 of the light-brush 1310 can make.

The light brush 1310 further includes one or more batteries 116, the light switch, and one or more UV LEDs 112 mounted in the housing 111. The housing 111 may include a replaceable cap 1313 to hold the batteries 116 within the housing and allow them to be replaced. In another embodiment of the invention, the batteries 116 may be rechargeable and the housing may include a charger connector 1316 to recharge the batteries through a battery charger 1320 with AC terminals 1322 to plug into an AC power outlet. Other embodiments of the invention may include rechargeable batteries with a plug to be charged through a battery charger.

The proximal end of the fiber optic bristles 1312 are optically coupled to the one or more LEDs 112 to receive the activation light. The bristles 1312 are used to direct the activation light to desirable points at the distal end thereof.

Referring now to FIG. 14A, a side view of a light spray can 1410 is illustrated. The light spray can 1410 includes a hollow housing 111' shaped like a hand-held spray paint can. The spray can 1410 further includes a spray-like nozzle 1414 that functions as the button of the light switch 114 and the point of light spray. The spray can 1410 further includes one or more UV LEDs 112 to generate the activating light for photo-chromic/phosphorescent material. One or more light pipes 1416 extend from the optical output of the LEDs 112 to the nozzle 1414 in one embodiment of the invention. The spray can 1410 includes one or more batteries 116 to power the LEDs ON in response to the nozzle being pushed down and momentarily activating the electrical switch 114 to close the circuit. The LEDs are turned OFF in response to the pressure on the nozzle being released and the switch 114 being returned to an OFF position and open circuit condition. A spring 1418 may assist to return the nozzle to the OFF position.

The activating light 118 may be sprayed out by the one or more light pipes 1416 onto the photo-chromic/phosphorescent toy 100 or photo-chromic/phosphorescent page 800A. The spray can forms a spray-like activated photo-chromic/phosphorescent pattern 1404' in the photo-chromic/phosphorescent material 104. The light spray can 1410 provides a spray effect to "paint" with light. While the light spray can is shaped like a spray can, the housing 111' may have other shapes with a nozzle having other shapes and acting as a push button for the switch.

Referring now to FIG. 14B, a magnified cross-sectional view of an embodiment of the nozzle 1414 for the light spray can 1410 is illustrated. The nozzle 1414 in one embodiment of the invention includes a distal end of one or more light pipes 1416 that extend from one or more UV LEDs 112 at a proximal end. The light pipes may be curved to output the activating light at a side of the nozzle. The nozzle 1414 further includes a shoulder or tab 1415 to couple the switch 114 and mechanically activate when the nozzle is depressed and released. The spring 1418 may coupled to the shoulder 1415 of the nozzle at one end to push back out on the nozzle when released and turn off the switch 114.

Referring now to FIG. 14C, a magnified cross-sectional view of another embodiment of the nozzle 1414' for the light spray can 1410 is illustrated. The nozzle 1414' in this embodiment of the invention includes the one or more LEDs 112 mounted and optics 1420 mounted therein. The optics 1420 are optically coupled to the optical output of the LEDs along the optical axis of each. The optics 1420 convert the active light generated by the LEDs into a spray effect. The optics 1420 may be a combination of one or more lenses and/or one or more light filters or masks. The nozzle 1414' does away with the one or more light pipes 1416. The nozzle 1414 further includes the shoulder or tab 1415 to couple the switch 114 and mechanically activate when the nozzle is depressed and released. The spring 1418 may also be coupled to the shoulder 1415 of the nozzle at one end to push back out on the nozzle when released and turn off the switch 114.

Figure 15:
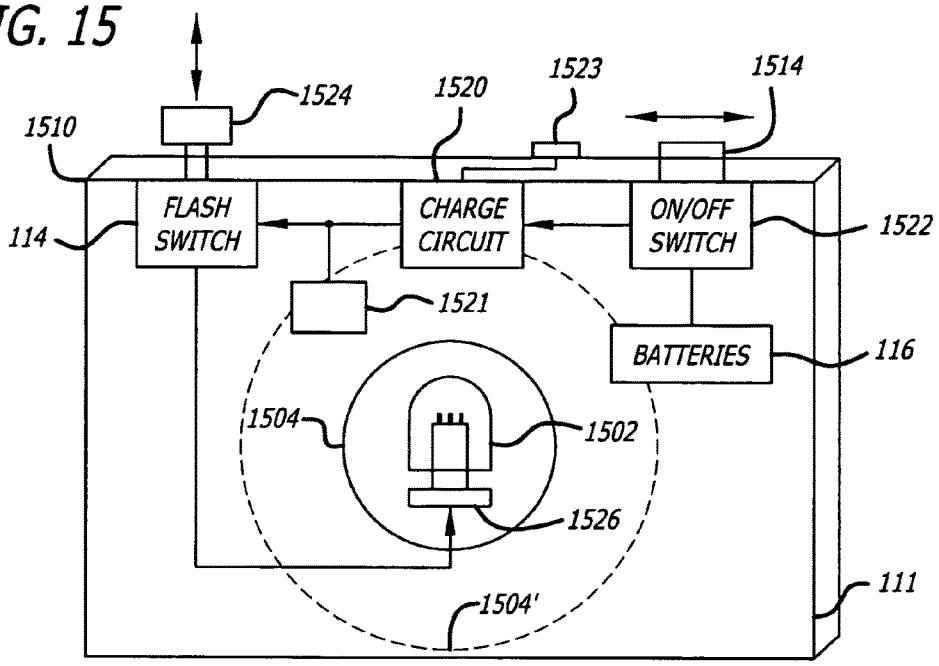
FIG. 15 illustrates a perspective view of a hand held flash activator that may be used to activate photo-chromic and phosphorescent materials.

Referring now to FIG. 15, a hand held flash activator 1510 is illustrated. Instead of using LEDs, the flash activator 1510 uses a flash bulb 1502 to more quickly-and energetically generate an activation light. The flash bulb 1502 is selected to generate light with a wavelength concentrated (e.g., purple, violet, UV) in the range of activation light previously described. The activation light generated by the flash bulb 1502 is stronger than that generated by UV LEDs. The flash activator 1510 further includes a concave reflector 1504 mounted in the housing 111 to reflect the back light rays outward from the flash bulb 1502. The diameter of the concave reflector 1504 may be as large as the housing 111 as illustrated by reflector 1504' in dashed lines.

The flash activator 1510 includes the flash bulb 1502, one or more batteries 116, an ON/OFF sliding switch 1522, a charge circuit 1520, energy storage device 1521, and a momentary switch 114 coupled together as shown and mounted within a housing 111. The one or more batteries 116 may be rechargeable. The ON/OFF sliding switch 1522 may be activated by a sliding button 1514 extending out from the housing 111. The flash switch 114 is activated by a push button 1524 extending from the housing 111.

A user slides the slider 1514 to slide the switch 1522 to an ON state. The power from the batteries 116 is then supplied to the charge circuit 1520. The charge circuit charges up an energy storage device 1521, such as a capacitor, which is also coupled to the flash switch 114. The activator 1510 may include a visible light LED 1523 to indicate to a user when the charge circuit has completed charging of the energy storage device 1521. Then, a user can push on the push-button 1524 to activate the flash switch 114. The flash switch 114 couples the charge stored on the energy storage device into the flash bulb 1502 causing it to generate electromagnetic radiation, light or photons having the desired wavelength to activate photo-chromic and phosphorescent materials.

Figure 16A:
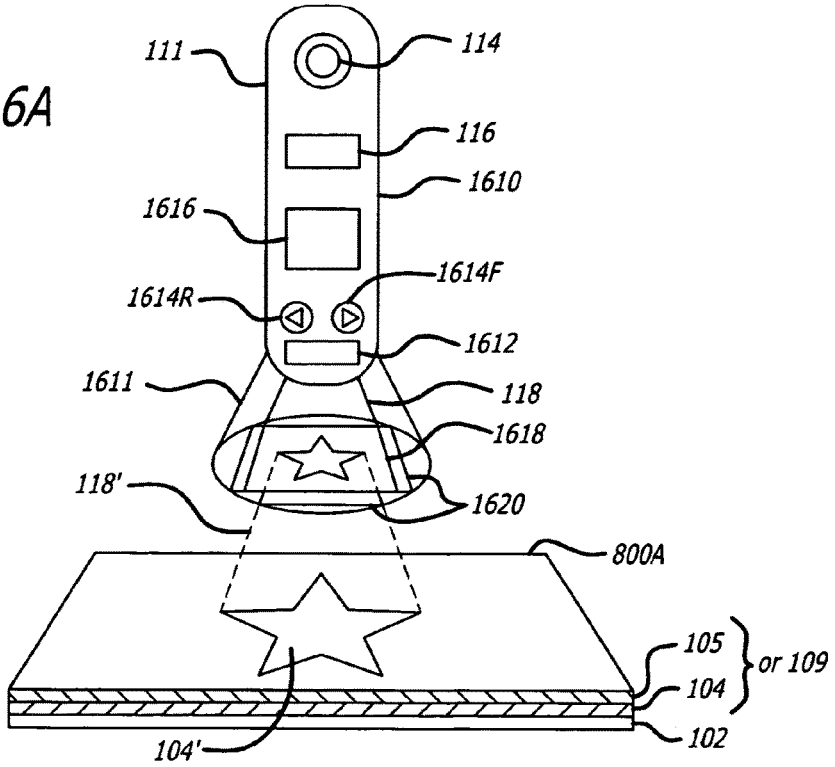
FIG. 16A illustrates an electronic light stencil to activate an area of photo-chromic and phosphorescent material on a page.

Referring now to FIG. 16A, an electronic light stencil 1610 is illustrated. The electronic light stencil 1610 is used to activate an activated photo-chromic/phosphorescent area 104' of photo-chromic and/or phosphorescent materials on a photo-chromic/phosphorescent page 800A. The electronic light stencil 1610 includes a transflective liquid crystal display (LCD) screen 1518 mounted in a light housing 1611 to generate an electronic stencil. Inner surfaces of the light housing 1611 may be coated with a reflective material to reflect the backlighting from a UV backlight 1612 into the LCD screen 1618.

The electronic light stencil 1610 further includes the light switch 114, one or more batteries 116, memory 1616, reverse button 1614R, forward button 1614F, and the UV backlight 1612 mounted in a first housing 111. The memory 1516 provides storage for various electronic templates or stencils that are displayed on the LCD screen 1618. The electronic light stencil 1610 further includes row and column LCD drivers 1620 mounted in the light housing 1611 to drive the LCD screen 1618 to generate the electronic stencil in response to the stencil data of the memory 1516.

Because the LCD screen 1618 is transflective, a user can look into the LCD screen to preview line art pictures (in reverse or negative image format) that can be used as a stencil. The forward button 1614F and the reverse button 1614R may be used to move forward and backward through the stencils that are stored in the memory 1616. Once a stencil has been selected, the electronic light stencil 1610 is placed on or substantially close to the surface of the photo-chromic/phosphorescent page 800A.

The light switch 114 is then pressed and the back light 1612 is turned ON to generate the activating light 118 that is shined into the LCD screen 1618. The stencil image displayed by the LCD screen 1618 masks out the incident activating light 118 into a stencil patterned activating light 118'. The transparent portions in the LCD screen 1618 displaying the stencil image allow the incident activating light 118 to pass through. The dark or opaque portions of the stencil image deter the incident activating light 118 from passing through. When an activating light is used to shine through the stencil image, photo-chromic and/or phosphorescent materials 104,105,109 on the substrate 102 are exposed within an area corresponding to the transparent portions of the stencil image.

The stencil patterned activating light 118' output by the electronic light stencil 1610 is used to activate a portion of the photo-chromic and/or phosphorescent materials 104, 105,109 as an activated photo-chromic/phosphorescent area 104'. The activated photo-chromic/phosphorescent area 104' may change for differing electronic stencils.

While the electronic light stencil 1610 is described as being hand held, it may be also mounted to a structure to be supported as an overhead light source. Instead of using an electronic stencil, a physical replaceable stencil may be used instead in an alternate embodiment of the invention.

Figure 16B:
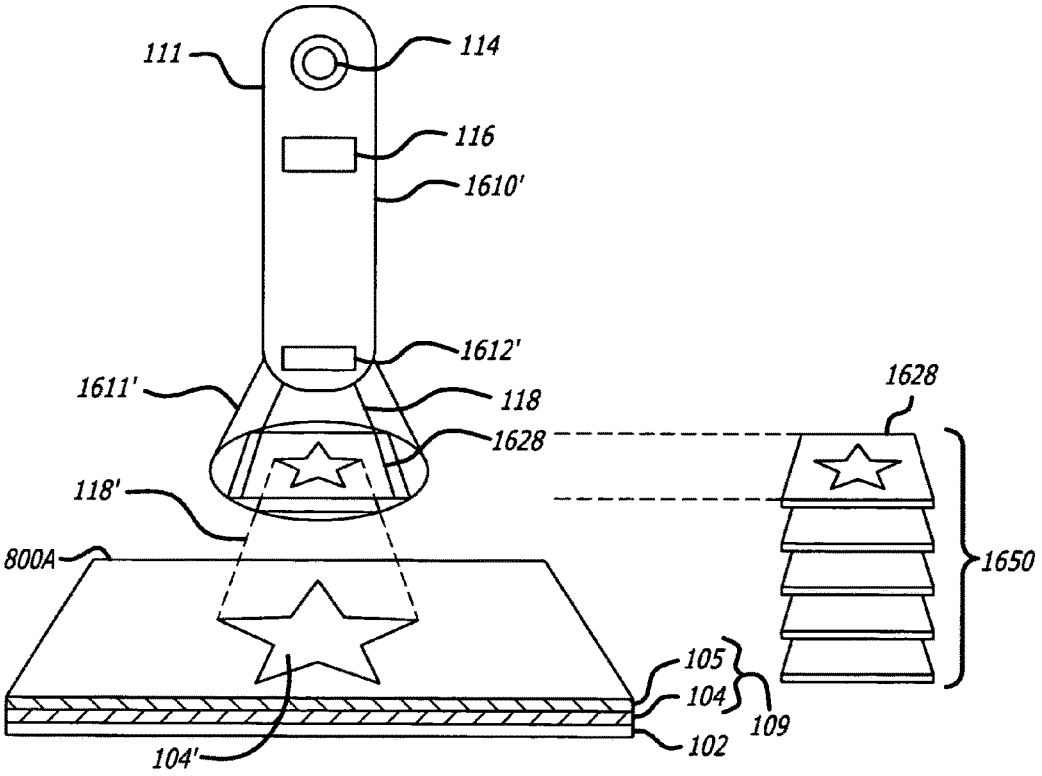
FIG. 16B illustrates a stencil light to activate an area of photo-chromic and phosphorescent material on a page.

Referring now to FIG. 16B, a stencil light 1610' is illustrated over a photo-chromic/phosphorescent page 800A. The stencil light 1610' includes a housing 1611' that receives one of a set of physical stencils 1650 instead of generating a stencil image with an LCD screen. The stencil light further includes one or more batteries 116, the light switch 114, and one or more activating light sources 1612'. The activating light sources 1612' may be one or more UV LEDs. The stencil housing 1611 may be coated on the inside with a reflector to reflect the activating light from the light sources 1612' to the stencil 1628 that is mounted in the housing.

Figure 16C:
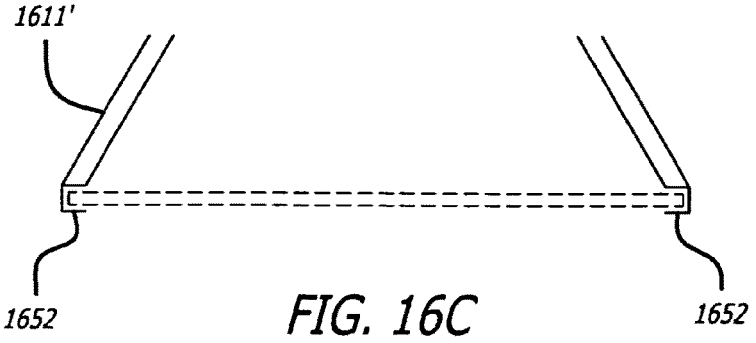
FIG. 16C illustrates a magnified cross-sectional view of the stencil housing of the stencil light of FIG. 16B.

The stencils 1628 of the set of stencils 1650 are each similarly sized to slide into and out of the stencil housing 1611'. As illustrated in FIG. 16C, the stencil housing 1611' further includes a pair of guide rails 1652 to slideably hold the stencil 1628 in place.

Figure 17A:
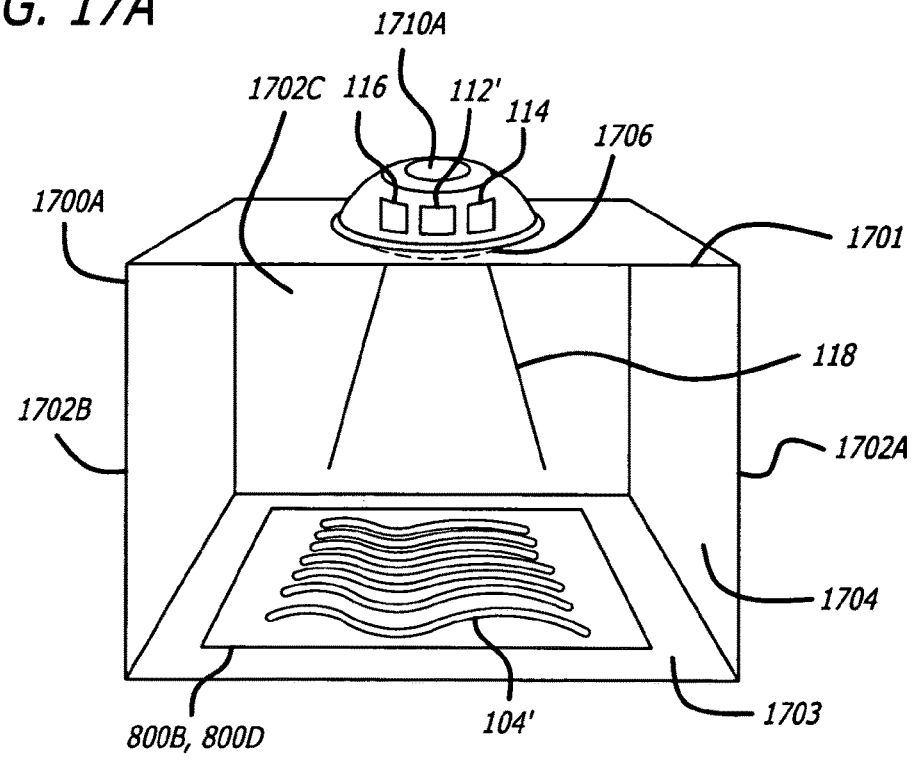
FIG. 17A illustrates an activation box.

Referring now to FIG. 17A, a photo-chromic/phosphorescent activation box 1700A is illustrated. The activation box 1700A includes a activating lamp 1710A mounted to a top 1701 in aligned with an opening 1706 therein so that the activating light 118 may shine down onto the photo-chromic/phosphorescent page 800B,800D and activate the design 104'. The activation box 1700A further includes sides 1702A-1702C with one open side 1704, and a bottom 1703 to hold the photo-chromic/phosphorescent page. A user can view the activated design 104' through the open side 1704. Alternatively or additionally, the sides 1702A-1702C and the top 170 may be transparent so that a user can view the activated design 104' from the top as well any side.

The activating lamp 1710A may include one or more batteries 116, the light switch 114, and a activating light source 112 to generate the activating light 118. The light source 112 may be an activating light bulb or UV LEDs.

Figure 17B:
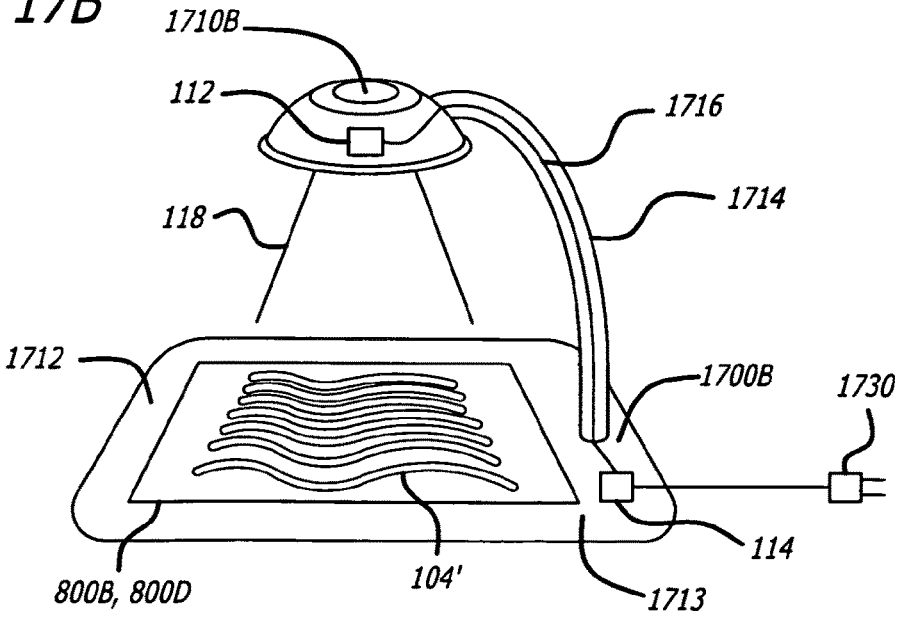
FIG. 17B illustrates an open overhead light table.

Referring now to FIG. 17B, an open overhead light table 1700B is illustrated. The light table 1700B includes an activating spot light 1710B, a support arm 1714, and a base 1712 coupled together as shown. The activating spot light 1710B is coupled to one end of the support arm 1714. An opposite end of the support arm 1714 is coupled to the base 1712. The support arm 1714 may be rigidly fixed in place or flexible to allow the spot light 1710B to be repositioned over the base 1712. The base 1712 provides a support surface within an activity area 1713 to support the photo-chromic/phosphorescent page 800B,800D aligned in place with the spot light 1710B. In this manner, the overhead spotlight 1710B may shine an activating light 118 down onto the photo-chromic/phosphorescent page within the activity area 1713 so that the design therein can be activated and visualized by a user.

The support arm 1714 is hollow to allow a power cable 1716 to couple between the activating light source and the light switch 114.

The activating spot light 1710B includes an activating light source 112 to generate the activating light 118. In one embodiment of the invention, the light source 112 is an activating light bulb that continuously generates the activating light 118 while power is supplied through the switch 114. The light bulb may be an AC light bulb, in which case, the plug 1730 plugs into an AC outlet to couple AC power to the switch and the light bulb. For example, the light bulb may be a violet light bulb, or a black light bulb as it may be more commonly referred. In another embodiment of the invention, the activating light source 112 is one or more UV LEDs. In this case, the plug 1730 is a power adapter to adapt AC power at an outlet into DC power for coupling to the UV LEDs 112.

The embodiments of the invention are thus described. While embodiments of the invention have been particularly described, they should not be construed as limited by such embodiments, but rather construed according to the claims that follow below.

While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

The invention claimed is:

1. A photo-chromic and phosphorescent toy comprising:

a substrate having a first side and a second side opposite the first side;

a photo-chromic material applied to the first side of the substrate, the photo-chromic material to transform in color for a first period of time after being activated by an activating light; and a phosphorescent material applied to the second side of the substrate, the phosphorescent material to emit light for a second period of time after being activated by the activating light.

2. The toy of claim 1, wherein the activating light is a purple light, a violet light, an ultraviolet light, or any combination thereof.

3. The toy of claim 1, wherein the toy is a drawing toy and the substrate is in the shape of a paper page.

4. The toy of claim 1, wherein the first period of time where the photo-chromic material transforms into color is less than sixty seconds, and the second period of time where the phosphorescent material emits light is less than sixty seconds.

5. The toy of claim 1, further comprising a template or stencil having a pattern, the template or stencil to mask the activating light and to activate a portion of the photo-chromic material corresponding to the pattern.

6. The toy of claim 1, further comprising a light pen to selectively shine the activating light over the photo-chromic material or the phosphorescent material.

7. The toy of claim 1, wherein the substrate is a solid formed out of plastics, papers, woods, metals, vinyl, fabric, combinations thereof, or other known solids.

*8. A photo-chromic and phosphorescent toy comprising:*

*a substrate having a first side;*

*a photo-chromic material applied to the first side of the substrate, the photo-chromic material to transform in color for a first period of time after being activated by an activating light; and*

*a phosphorescent material applied over the photo-chromic material, the phosphorescent material to emit light for a second period of time after being activated by the activating light.*

*9. The toy of claim 8, wherein the photochromic material is applied across the entire first side of the substrate to form a photo-chromic layer, and wherein the phosphorescent material is applied across the entire photochromic layer to form a phosphorescent layer, wherein a first side of the photochromic layer is coupled to the first side of the substrate and a second side of the photochromic layer is coupled to the phosphorescent layer, wherein the first side of the photochromic layer is opposite to the second side of the photochromic layer.*

*10. The toy of claim 8, wherein the photochromic material is applied over at least one portion of the first side of the substrate to form a pattern of photo-chromic layer, wherein at least one portion of the first side is less than the entire first side, and wherein the phosphorescent material is applied over the pattern of photochromic layer to form a phosphorescent layer, wherein a first side of the photochromic layer is coupled to the first side of the substrate and a second side of the photochromic layer is coupled to the phosphorescent layer, wherein the first side of the photochromic layer is opposite to the second side of the photochromic layer.*

*11. The toy of claim 10, wherein the phosphorescent material is applied over the pattern of photochromic layer and to portions of the first side of the substrate that do not have photochromic material thereon to form the phosphorescent layer.*

*12. The toy of claim 8, wherein the activating light is a purple light, a violet light, an ultraviolet light, or any combination thereof.*

*13. The toy of claim 8, wherein the toy is a drawing toy and the substrate is in the shape of a paper page.*

*14. The toy of claim 8, further comprising a template or stencil having a pattern, the template or stencil to mask the activating light and to activate a portion of the photo-chromic material corresponding to the pattern.*

*15. The toy of claim 8, further comprising a light pen to selectively shine the activating light over the photo-chromic material or the phosphorescent material.*

*16. The toy of claim 8, wherein the substrate is a solid formed out of plastics, papers, woods, metals, vinyl, fabric, combinations thereof, or other known solids.*

*17. A photo-chromic and phosphorescent toy comprising:*

*a substrate having a first side;*

*a phosphorescent material applied to the first side of the substrate, the phosphorescent material to emit light for a first period of time after being activated by the activating light; and*

*a photo-chromic material applied over the phosphorescent material, the photo-chromic material to transform in color for a second period of time after being activated by an activating light.*

*18. The toy of claim 17, wherein the phosphorescent material is applied across the entire first side of the substrate to form a phosphorescent layer, and wherein the photo-chromic material is applied across the entire phosphorescent layer to form a photo-chromic layer, wherein a first side of the phosphorescent layer is coupled to the first side of the substrate and a second side of the phosphorescent layer is coupled to the photo-chromic layer, wherein the first side of the phosphorescent layer is opposite to the second side of the phosphorescent layer.*

*19. The toy of claim 17, wherein the phosphorescent material is applied over at least one portion of the first side of the substrate to form a pattern of phosphorescent layer, wherein at least one portion of the first side is less than the entire first side, and wherein the photo-chromic material is applied over the pattern of phosphorescent layer to form a photo-chromic layer, wherein a first side of the phosphorescent layer is coupled to the first side of the substrate and a second side of the phosphorescent layer is coupled to the photo-chromic layer, wherein the first side of the phosphorescent layer is opposite to the second side of the phosphorescent layer.*

*20. The toy of claim 17, wherein the phosphorescent material is applied across the entire first side of the substrate to form a phosphorescent layer, and wherein the photo-chromic material is applied over at least one portion of a second side of the phosphorescent layer to form a pattern of photo-chromic layer, wherein a first side of the phosphorescent layer is coupled to the first side of the substrate and the second side of the phosphorescent layer is coupled to the pattern of photo-chromic layer, wherein the first side of the phosphorescent layer is opposite to the second side of the phosphorescent layer.*

*21. The toy of claim 17, wherein the activating light is a purple light, a violet light, an ultraviolet light, or any combination thereof.*

*22. The toy of claim 17, wherein the toy is a drawing toy and the substrate is in the shape of a paper page.*

*23. The toy of claim 17, further comprising a template or stencil having a pattern, the template or stencil to mask the activating light and to activate a portion of the photo-chromic material corresponding to the pattern.*

*24. The toy of claim 17, further comprising a light pen to selectively shine the activating light over the photo-chromic material or the phosphorescent material.*

*25. The toy of claim 17, wherein the substrate is a solid formed out of plastics, papers, woods, metals, vinyl, fabric, combinations thereof, or other known solids.*

*26. A photo-chromic and phosphorescent toy comprising:*

*a substrate having a first side; and*

*a mixed photo-chromic and phosphorescent material applied to the first side of the substrate, wherein a photo-chromic material included in the mixed photo-chromic and phosphorescent material to transform in color for a first period of time after being activated by an activating light, the phosphorescent material included in the mixed photo-chromic and phosphorescent material to emit light for a second period of time after being activated by the activating light.*

*27. The toy in claim 26, wherein the mixed photo-chromic and phosphorescent material is applied across the entire first side of the substrate to form a mixed layer.*

*28. The toy in claim 26, wherein the mixed photo-chromic and phosphorescent material is applied to at least one portion of the first side of the substrate to form a pattern of mixed layer, wherein at least one portion of the first side is less than the entire first side of the substrate.*

* * * * *